(12) United States Patent
Casati

(10) Patent No.: US 12,127,105 B2
(45) Date of Patent: Oct. 22, 2024

(54) MANAGING MODE OF ACCESS TO A COMPATIBLE SET OF NETWORK SLICES

(71) Applicant: Nokia Technologies Oy, Espoo (FI)

(72) Inventor: Alessio Casati, West Molesey (GB)

(73) Assignee: Nokia Technologies Oy, Espoo (FI)

( * ) Notice: Subject to any disclaimer, the term of this patent is extended or adjusted under 35 U.S.C. 154(b) by 331 days.

(21) Appl. No.: 17/510,115

(22) Filed: Oct. 25, 2021

(65) Prior Publication Data
US 2022/0141763 A1   May 5, 2022

Related U.S. Application Data

(60) Provisional application No. 63/109,673, filed on Nov. 4, 2020.

(51) Int. Cl.
*H04W 48/18*   (2009.01)
*H04W 48/16*   (2009.01)
*H04W 60/00*   (2009.01)

(52) U.S. Cl.
CPC ........... *H04W 48/18* (2013.01); *H04W 48/16* (2013.01); *H04W 60/00* (2013.01)

(58) Field of Classification Search
CPC ...... H04W 48/16; H04W 48/18; H04W 60/00
See application file for complete search history.

(56) References Cited

U.S. PATENT DOCUMENTS

2020/0260340 A1*  8/2020  Jing .................. H04W 36/0022
2023/0052699 A1*  2/2023  Ninglekhu ............ H04W 48/16

OTHER PUBLICATIONS

"3rd Generation Partnership Project; Technical Specification Group Services and System Aspects; Study on enhancement of network slicing; Phase 2 (Release 17)", 3GPP TR 23.700-40, V1.0.0, Sep. 2020, 193 pages.

* cited by examiner

*Primary Examiner* — Wayne H Cai
(74) *Attorney, Agent, or Firm* — Barta Jones, PLLC

(57) ABSTRACT

Methods, systems, apparatuses, and computer program products are provided for managing mode of access to a compatible set of network slices of a communications network. In this regard, a registration request message is received from user equipment. The registration request message includes an indication of at least one simultaneous network slice use mode of operation for the user equipment. Furthermore, a selected simultaneous network slice use mode of operation for the user equipment is determined. The selected simultaneous network slice use mode of operation is a simultaneous network slice use mode of operation indicated by the user equipment or an alternate mode of operation associated with a configured network slice selection assistance information (NSSAI). Configuration information is also provided to the user equipment. The configuration information includes instructions for the user equipment to be configured with the selected simultaneous network slice use mode of operation, the configured NSSAI, and an allowed NSSAI.

13 Claims, 10 Drawing Sheets

MANAGING MODE OF ACCESS TO A COMPATIBLE SET OF NETWORK SLICES

TECHNOLOGICAL FIELD

An example embodiment of the present disclosure generally relates to communication systems and, more particularly, to managing mode of access to a compatible set of network slices of a communications network.

BACKGROUND

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

Third generation partnership project (3GPP) 5G technology is a next generation of radio systems and network architecture that can deliver extreme broadband and ultra-robust, low latency connectivity. 5G technology improves a variety of telecommunication services offered to the end users and helps to support massive broadband that delivers gigabytes of bandwidth per second on demand for both the uplink and downlink transmissions. Next generation systems, which utilize the 5G architecture, utilize virtualized radio access network (RAN) functions and core network functions.

In a 5G network, network slicing is a concept for running multiple logical networks as virtually independent operations on a common physical infrastructure. A network slice is considered as an independent virtualized end-to-end network. Currently, standardization efforts are being made on simplifying the way network slices are defined, how user equipment register and deregister with a network slice, and how a protocol data unit (PDU) session is admitted to a network slice. However, under the current 3GPP specifications, enforcing such activities is complex and typically rests with the user equipment, meaning the network operator has little control over user equipment behavior during such activities. Furthermore, under the current 3GPP specifications, policies for use of a network slice by user equipment generally constrain network slice usage and/or PDU session capability of the user equipment.

BRIEF SUMMARY

Methods, apparatuses and computer program products are provided in accordance with example embodiments to provide for managing mode of access to a compatible set of network slices of a communications network.

In an example embodiment, a method is provided. The method includes receiving a registration request message from user equipment. In this example embodiment, the registration request message comprises an indication of at least one simultaneous network slice use mode of operation for the user equipment. The method also includes determining a selected simultaneous network slice use mode of operation for the user equipment. In this example embodiment, the selected simultaneous network slice use mode of operation is a simultaneous network slice use mode of operation indicated by the user equipment or an alternate mode of operation associated with a configured network slice selection assistance information (NSSAI) for the user equipment. Furthermore, the method includes causing provision of configuration information to the user equipment. In this example embodiment, the configuration information comprises instructions for the user equipment to be configured with the selected simultaneous network slice use mode of operation, the configured NSSAI, and an allowed NSSAI for the user equipment.

In some embodiments, the determining the selected simultaneous network slice use mode of operation comprises determining the selected simultaneous network slice use mode of operation based on a comparison between user equipment behavior associated with the mode of operation and network behavior associated with a set of network slices of a communications system.

In some embodiments, the determining the selected simultaneous network slice use mode of operation for the user equipment comprises selecting a user plane-centric simultaneous network slice use mode for the user equipment. In some embodiments, the user plane-centric simultaneous network slice use mode facilitates identification of a protocol data unit (PDU) session for simultaneous execution with respect to a network slice. In some embodiments, the method includes performing a compatibility check of simultaneous use of network slices during the PDU session establishment. In some embodiments, the method includes identifying the PDU session for the user plane-centric simultaneous network slice use mode based on compatibility information indicative of compatibility between network slices.

In some embodiments, the determining the selected simultaneous network slice use mode of operation for the user equipment comprises selecting a control plane-centric simultaneous network slice use mode for the user equipment. In some embodiments, the control plane-centric simultaneous network slice use mode facilitates identification of network slices that are mutually compatible. In some embodiments, the method includes performing a compatibility check of simultaneous use of network slices during registration.

In some embodiments, the causing the provision of the configuration information comprises indicating only a compatible set of network slices in the configured NSSAI for the user equipment for the selected simultaneous network slice use mode of operation. In some embodiments, the causing the provision of the configuration information comprises causing instruction of the user equipment to update configuration of the user equipment to facilitate employing one or more network slices that satisfy a defined criterion associated with user equipment behavior. In some embodiments, the causing the provision of the configuration information comprises causing instruction of the user equipment to adjust one or more registered network slices based on the selected simultaneous network slice use mode of operation. In some embodiments, the causing the provision of the configuration information comprises causing instruction of the user equipment to adjust one or more PDU sessions based on the selected simultaneous network slice use mode of operation. In some embodiments, the causing the provision of the configuration information comprises causing instruction of the user equipment to apply one or more compatibility rules for one or more PDU sessions based on the selected simultaneous network slice use mode of operation.

In another example embodiment, an apparatus includes processing circuitry and at least one memory including computer program code instructions that are configured to, when executed by the processing circuitry, cause the apparatus to receive a registration request message from user equipment. In this example embodiment, the registration request message comprises an indication of at least one simultaneous network slice use mode of operation for the user equipment. The computer program code instructions are also configured to, when executed by the processing circuitry, cause the apparatus to determine a selected simultaneous network slice use mode of operation for the user equipment. In this example embodiment, the selected simultaneous network slice use mode of operation is a simultaneous network slice use mode of operation indicated by the user equipment or an alternate mode of operation associated with a configured NSSAI for the user equipment. The computer program code instructions are also configured to, when executed by the processing circuitry, cause the apparatus to cause provision of configuration information to the user equipment. In this example embodiment, the configuration information comprises instructions for the user equipment to be configured with the selected simultaneous network slice use mode of operation, the configured NSSAI, and an allowed NSSAI for the user equipment.

In some embodiments, the computer program code instructions are also configured to, when executed by the processing circuitry, cause the apparatus to determine the selected simultaneous network slice use mode of operation based on a comparison between user equipment behavior associated with the mode of operation and network behavior associated with a set of network slices of a communications system.

In some embodiments, the computer program code instructions are also configured to, when executed by the processing circuitry, cause the apparatus to select a user plane-centric simultaneous network slice use mode for the user equipment, and wherein the user plane-centric simultaneous network slice use mode facilitates identification of a PDU session for simultaneous execution with respect to a network slice. In some embodiments, the computer program code instructions are also configured to, when executed by the processing circuitry, cause the apparatus to perform a compatibility check of simultaneous use of network slices during the PDU session establishment. In some embodiments, the computer program code instructions are also configured to, when executed by the processing circuitry, cause the apparatus to identify the PDU session for the user plane-centric simultaneous network slice use mode based on compatibility information indicative of compatibility between network slices.

In some embodiments, the computer program code instructions are also configured to, when executed by the processing circuitry, cause the apparatus to select a control plane-centric simultaneous network slice use mode for the user equipment, and wherein the control plane-centric simultaneous network slice use mode facilitates identification of network slices that are mutually compatible. In some embodiments, the computer program code instructions are also configured to, when executed by the processing circuitry, cause the apparatus to perform a compatibility check of simultaneous use of network slices during registration.

In some embodiments, the computer program code instructions are also configured to, when executed by the processing circuitry, cause the apparatus to indicate only a compatible set of network slices in the configured NSSAI for the user equipment for the selected simultaneous network slice use mode of operation. In some embodiments, the computer program code instructions are also configured to, when executed by the processing circuitry, cause the apparatus to cause instruction of the user equipment to update configuration of the user equipment to facilitate employing one or more network slices that satisfy a defined criterion associated with user equipment behavior. In some embodiments, the computer program code instructions are also configured to, when executed by the processing circuitry, cause the apparatus to cause instruction of the user equipment to adjust one or more registered network slices based on the selected simultaneous network slice use mode of operation. In some embodiments, the computer program code instructions are also configured to, when executed by the processing circuitry, cause the apparatus to cause instruction of the user equipment to adjust one or more PDU sessions based on the selected simultaneous network slice use mode of operation. In some embodiments, the computer program code instructions are also configured to, when executed by the processing circuitry, cause the apparatus to cause instruction of the user equipment to apply one or more compatibility rules for one or more PDU sessions based on the selected simultaneous network slice use mode of operation.

In another example embodiment, a computer program product is provided. The computer program product includes at least one non-transitory computer readable storage medium having computer-executable program code instructions stored therein with the computer-executable program code instructions including program code instructions configured, upon execution, to receive a registration request message from user equipment. In this example embodiment, the registration request message comprises an indication of at least one simultaneous network slice use mode of operation for the user equipment. The computer-executable program code instructions are also configured to determine a selected simultaneous network slice use mode of operation for the user equipment. In this example embodiment, the selected simultaneous network slice use mode of operation is a simultaneous network slice use mode of operation indicated by the user equipment or an alternate mode of operation associated with a configured NSSAI for the user equipment. Furthermore, the computer-executable program code instructions are configured to cause provision of configuration information to the user equipment. In this example embodiment, the configuration information comprises instructions for the user equipment to be configured with the selected simultaneous network slice use mode of operation, the configured NSSAI, and an allowed NSSAI for the user equipment.

In some embodiments, the computer-executable program code instructions are configured to determine the selected simultaneous network slice use mode of operation based on a comparison between user equipment behavior associated with the mode of operation and network behavior associated with a set of network slices of a communications system.

In some embodiments, the computer-executable program code instructions are configured to select a user plane-centric simultaneous network slice use mode for the user equipment. In some embodiments, the user plane-centric simultaneous network slice use mode facilitates identification of a PDU session for simultaneous execution with respect to a network slice. In some embodiments, the computer-executable program code instructions are configured to perform a compatibility check of simultaneous use of network slices during the PDU session establishment.

In some embodiments, the computer-executable program code instructions are configured to identify the PDU session for the user plane-centric simultaneous network slice use mode based on compatibility information indicative of compatibility between network slices. In some embodiments, the computer-executable program code instructions are configured to select a control plane-centric simultaneous network slice use mode for the user equipment. In some embodiments, the control plane-centric simultaneous network slice use mode facilitates identification of network slices that are mutually compatible. In some embodiments, the computer-executable program code instructions are configured to perform a compatibility check of simultaneous use of network slices during registration.

In some embodiments, the computer-executable program code instructions are configured to indicate only a compatible set of network slices in the configured NSSAI for the user equipment for the selected simultaneous network slice use mode of operation. In some embodiments, the computer-executable program code instructions are configured to update configuration of the user equipment to facilitate employing one or more network slices that satisfy a defined criterion associated with user equipment behavior. In some embodiments, the computer-executable program code instructions are configured to adjust one or more registered network slices based on the selected simultaneous network slice use mode of operation. In some embodiments, the computer-executable program code instructions are configured to adjust one or more PDU sessions based on the selected simultaneous network slice use mode of operation. In some embodiments, the computer-executable program code instructions are configured to cause instruction of the user equipment to apply one or more compatibility rules for one or more PDU sessions based on the selected simultaneous network slice use mode of operation.

In yet another example embodiment, an apparatus is provided that includes means for receiving a registration request message from user equipment, where the registration request message comprises an indication of at least one simultaneous network slice use mode of operation for the user equipment. The apparatus of this example embodiment also includes means for determining a selected simultaneous network slice use mode of operation for the user equipment, where the selected simultaneous network slice use mode of operation is a simultaneous network slice use mode of operation indicated by the user equipment or an alternate mode of operation associated with a configured network slice selection assistance information (NSSAI) for the user equipment. The apparatus of this example embodiment also includes means for causing provision of configuration information to the user equipment, wherein the configuration information comprises instructions for the user equipment to be configured with the selected simultaneous network slice use mode of operation, the configured NSSAI, and an allowed NSSAI for the user equipment.

In some embodiments, the means for the determining the selected simultaneous network slice use mode of operation comprises means for determining the selected simultaneous network slice use mode of operation based on a comparison between user equipment behavior associated with the mode of operation and network behavior associated with a set of network slices of a communications system.

In some embodiments, the means for the determining the selected simultaneous network slice use mode of operation for the user equipment comprises means for selecting a user plane-centric simultaneous network slice use mode for the user equipment, where the user plane-centric simultaneous network slice use mode facilitates identification of a protocol data unit (PDU) session for simultaneous execution with respect to a network slice. In some embodiments, the apparatus of this example embodiment also includes means for performing a compatibility check of simultaneous use of network slices during the PDU session establishment.

In some embodiments, the apparatus of this example embodiment also includes means for identifying the PDU session for the user plane-centric simultaneous network slice use mode based on compatibility information indicative of compatibility between network slices.

In some embodiments, the means for the determining the selected simultaneous network slice use mode of operation for the user equipment comprises means for selecting a control plane-centric simultaneous network slice use mode for the user equipment, where the control plane-centric simultaneous network slice use mode facilitates identification of network slices that are mutually compatible. In some embodiments, the apparatus of this example embodiment also includes means for performing a compatibility check of simultaneous use of network slices during registration.

In some embodiments, the means for the causing the provision of the configuration information comprises means for indicating only a compatible set of network slices in the configured NSSAI for the user equipment for the selected simultaneous network slice use mode of operation.

In some embodiments, the means for the causing the provision of the configuration information comprises means for causing instruction of the user equipment to update configuration of the user equipment to facilitate employing one or more network slices that satisfy a defined criterion associated with user equipment behavior. In some embodiments, the means for the causing the provision of the configuration information comprises means for causing instruction of the user equipment to adjust one or more registered network slices based on the selected simultaneous network slice use mode of operation. In some embodiments, the means for the causing the provision of the configuration information comprises means for causing instruction of the user equipment to adjust one or more PDU sessions based on the selected simultaneous network slice use mode of operation. In some embodiments, the means for the causing the provision of the configuration information comprises means for causing instruction of the user equipment to apply one or more compatibility rules for one or more PDU sessions based on the selected simultaneous network slice use mode of operation.

In an example embodiment, a method is provided. The method includes causing transmission of a registration request message associated with user equipment to a network device. In this example embodiment, the registration request message comprises an indication of at least one simultaneous network slice use mode of operation for the user equipment. The method also includes receiving, from the network device, configuration information comprising instructions for the user equipment to be configured with a selected simultaneous network slice use mode of operation for the user equipment. In this example embodiment, selected simultaneous network slice use mode of operation is a simultaneous network slice use mode of operation indicated by the user equipment or an alternate mode of operation associated with a configured NSSAI for the user equipment. The method also includes configuring the user equipment with the selected simultaneous network slice use mode of operation, the configured NSSAI, and an allowed NSSAI for the user equipment.

In some embodiments, the receiving the configuration information comprises receiving instructions to configure the user equipment with a user plane-centric simultaneous network slice use mode for the user equipment, where the user plane-centric simultaneous network slice use mode facilitates identification of a PDU session for simultaneous execution with respect to a network slice.

In some embodiments, the receiving the configuration information comprises receiving instructions to configure the user equipment with a control plane-centric simultaneous network slice use mode for the user equipment, where the control plane-centric simultaneous network slice use mode facilitates identification of network slices that are mutually compatible. In some embodiments, the receiving the configuration information comprises receiving an indication of only a compatible set of network slices in the configured NSSAI for the user equipment for the selected simultaneous network slice use mode of operation. In some embodiments, the receiving the configuration information comprises receiving an indication to employ one or more network slices that satisfy a defined criterion associated with user equipment behavior. In some embodiments, the receiving the configuration information comprises receiving an indication to adjust one or more registered network slices based on the selected simultaneous network slice use mode of operation. In some embodiments, the receiving the configuration information comprises receiving an indication to adjust one or more PDU sessions based on the selected simultaneous network slice use mode of operation. In some embodiments, the receiving the configuration information comprises receiving an indication to apply one or more compatibility rules for one or more PDU sessions based on the selected simultaneous network slice use mode of operation.

In another example embodiment, an apparatus includes processing circuitry and at least one memory including computer program code instructions that are configured to, when executed by the processing circuitry, cause the apparatus to cause transmission of a registration request message associated with user equipment to a network device, where the registration request message comprises an indication of at least one simultaneous network slice use mode of operation for the user equipment. The computer program code instructions are also configured to, when executed by the processing circuitry, cause the apparatus to receive, from the network device, configuration information comprising instructions for the user equipment to be configured with a selected simultaneous network slice use mode of operation for the user equipment, where the selected simultaneous network slice use mode of operation is a simultaneous network slice use mode of operation indicated by the user equipment or an alternate mode of operation associated with a configured NSSAI for the user equipment. The computer program code instructions are also configured to, when executed by the processing circuitry, cause the apparatus to configure the user equipment with the selected simultaneous network slice use mode of operation, the configured NSSAI, and an allowed NSSAI for the user equipment.

In some embodiments, the computer program code instructions are also configured to, when executed by the processing circuitry, cause the apparatus to receive instructions to configure the user equipment with a user plane-centric simultaneous network slice use mode for the user equipment, where the user plane-centric simultaneous network slice use mode facilitates identification of a PDU session for simultaneous execution with respect to a network slice. In some embodiments, the computer program code instructions are also configured to, when executed by the processing circuitry, cause the apparatus to receive instructions to configure the user equipment with a control plane-centric simultaneous network slice use mode for the user equipment, where the control plane-centric simultaneous network slice use mode facilitates identification of network slices that are mutually compatible.

In some embodiments, the computer program code instructions are also configured to, when executed by the processing circuitry, cause the apparatus to receive an indication of only a compatible set of network slices in the configured NSSAI for the user equipment for the selected simultaneous network slice use mode of operation. In some embodiments, the computer program code instructions are also configured to, when executed by the processing circuitry, cause the apparatus to receive an indication to employ one or more network slices that satisfy a defined criterion associated with user equipment behavior. In some embodiments, the computer program code instructions are also configured to, when executed by the processing circuitry, cause the apparatus to receive an indication to adjust one or more registered network slices based on the selected simultaneous network slice use mode of operation. In some embodiments, the computer program code instructions are also configured to, when executed by the processing circuitry, cause the apparatus to receive an indication to adjust one or more PDU sessions based on the selected simultaneous network slice use mode of operation. In some embodiments, the computer program code instructions are also configured to, when executed by the processing circuitry, cause the apparatus to receive an indication to apply one or more compatibility rules for one or more PDU sessions based on the selected simultaneous network slice use mode of operation.

In another example embodiment, a computer program product is provided. The computer program product includes at least one non-transitory computer readable storage medium having computer-executable program code instructions stored therein with the computer-executable program code instructions including program code instructions configured, upon execution, cause transmission of a registration request message associated with user equipment to a network device, where the registration request message comprises an indication of at least one simultaneous network slice use mode of operation for the user equipment. The computer-executable program code instructions are also configured to receive, from the network device, configuration information comprising instructions for the user equipment to be configured with a selected simultaneous network slice use mode of operation for the user equipment, where the selected simultaneous network slice use mode of operation is a simultaneous network slice use mode of operation indicated by the user equipment or an alternate mode of operation associated with a configured NSSAI for the user equipment. Furthermore, the computer-executable program code instructions are configured to configure the user equipment with the selected simultaneous network slice use mode of operation, the configured NSSAI, and an allowed NSSAI for the user equipment.

In some embodiments, the computer-executable program code instructions are configured to receive instructions to configure the user equipment with a user plane-centric simultaneous network slice use mode for the user equipment, where the user plane-centric simultaneous network slice use mode facilitates identification of a PDU session for simultaneous execution with respect to a network slice.

In some embodiments, the computer-executable program code instructions are configured to receive instructions to configure the user equipment with a control plane-centric simultaneous network slice use mode for the user equipment, where the control plane-centric simultaneous network slice use mode facilitates identification of network slices that are mutually compatible.

In some embodiments, the computer-executable program code instructions are configured to receive an indication of only a compatible set of network slices in the configured NSSAI for the user equipment for the selected simultaneous network slice use mode of operation. In some embodiments, the computer-executable program code instructions are configured to receive an indication to employ one or more network slices that satisfy a defined criterion associated with user equipment behavior. In some embodiments, the computer-executable program code instructions are configured to receive an indication to adjust one or more registered network slices based on the selected simultaneous network slice use mode of operation. In some embodiments, the computer-executable program code instructions are configured to receive an indication to adjust one or more PDU sessions based on the selected simultaneous network slice use mode of operation. In some embodiments, the computer-executable program code instructions are configured to receive an indication to apply one or more compatibility rules for one or more PDU sessions based on the selected simultaneous network slice use mode of operation.

In yet another example embodiment, an apparatus is provided that includes means for causing transmission of a registration request message associated with user equipment to a network device, where the registration request message comprises an indication of at least one simultaneous network slice use mode of operation for the user equipment. The apparatus of this example embodiment also includes means for receiving, from the network device, configuration information comprising instructions for the user equipment to be configured with a selected simultaneous network slice use mode of operation for the user equipment, where the selected simultaneous network slice use mode of operation is a simultaneous network slice use mode of operation indicated by the user equipment or an alternate mode of operation associated with a configured NSSAI for the user equipment. The apparatus of this example embodiment also includes means for configuring the user equipment with the selected simultaneous network slice use mode of operation, the configured NSSAI, and an allowed NSSAI for the user equipment.

In some embodiments, the means for the receiving the configuration information comprises means for comprises receiving instructions to configure the user equipment with a user plane-centric simultaneous network slice use mode for the user equipment, and wherein the user plane-centric simultaneous network slice use mode facilitates identification of a PDU session for simultaneous execution with respect to a network slice.

In some embodiments, the means for the receiving the configuration information comprises means for receiving instructions to configure the user equipment with a control plane-centric simultaneous network slice use mode for the user equipment, and wherein the control plane-centric simultaneous network slice use mode facilitates identification of network slices that are mutually compatible.

In some embodiments, the means for the receiving the configuration information comprises means for receiving an indication of only a compatible set of network slices in the configured NSSAI for the user equipment for the selected simultaneous network slice use mode of operation. In some embodiments, the means for the receiving the configuration information comprises means for receiving an indication to employ one or more network slices that satisfy a defined criterion associated with user equipment behavior. In some embodiments, the means for the receiving the configuration information comprises means for receiving an indication to adjust one or more registered network slices based on the selected simultaneous network slice use mode of operation. In some embodiments, the means for the receiving the configuration information comprises means for receiving an indication to adjust one or more PDU sessions based on the selected simultaneous network slice use mode of operation. In some embodiments, the means for the receiving the configuration information comprises means for receiving an indication to apply one or more compatibility rules for one or more PDU sessions based on the selected simultaneous network slice use mode of operation

BRIEF DESCRIPTION OF THE DRAWINGS

Figure 1:
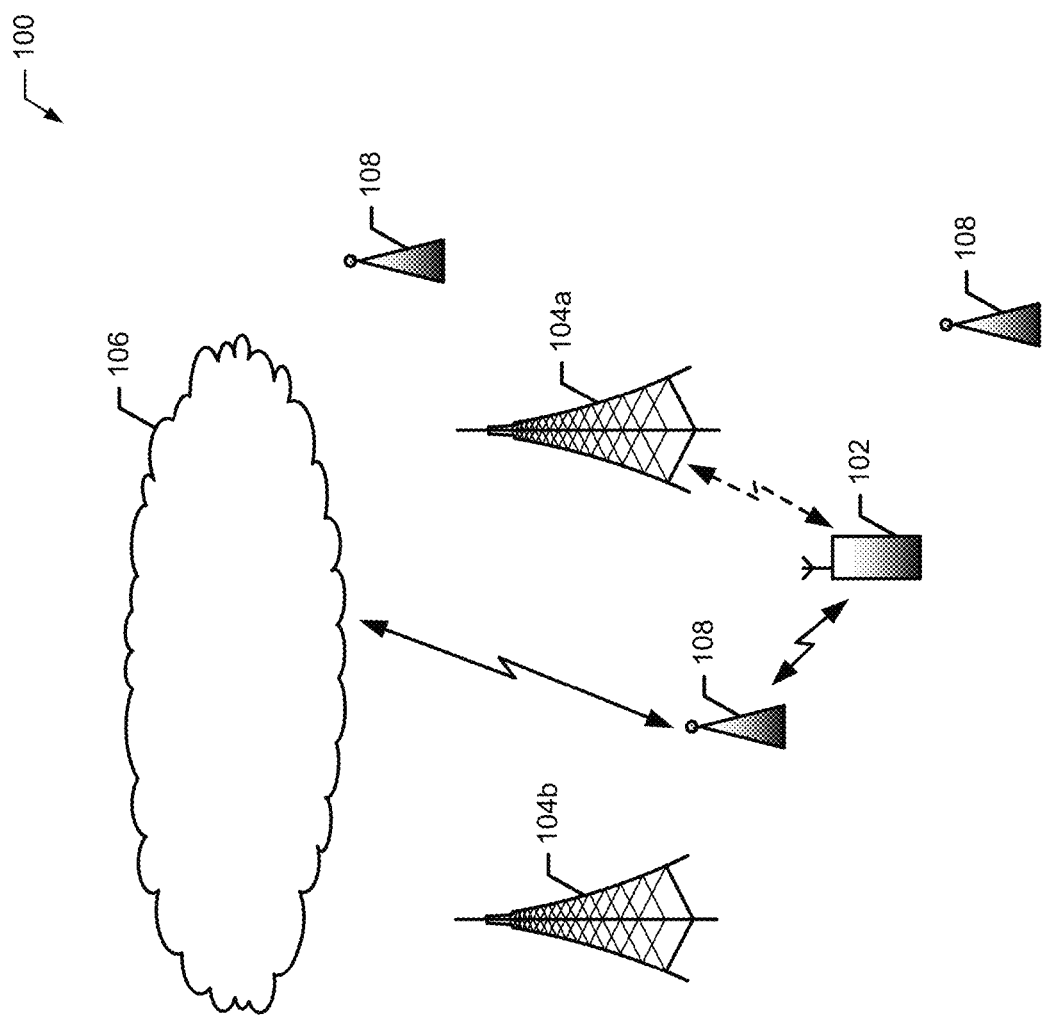
Figure 2:
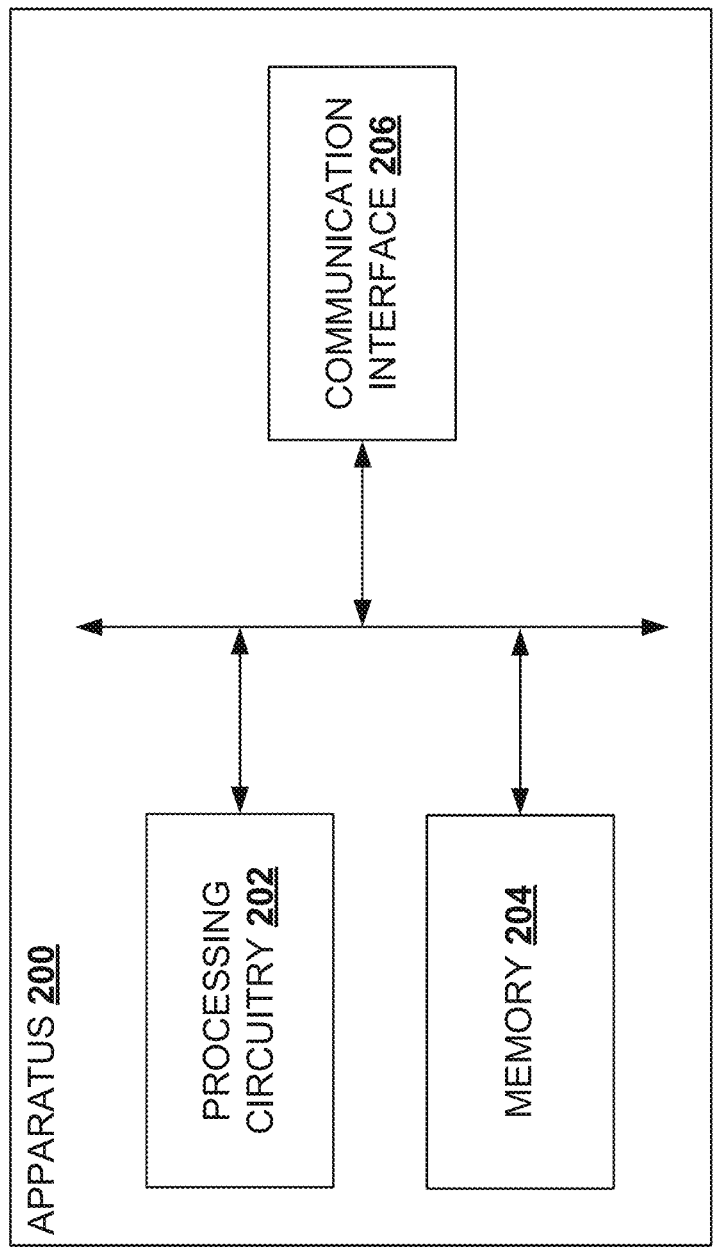
Figure 3:
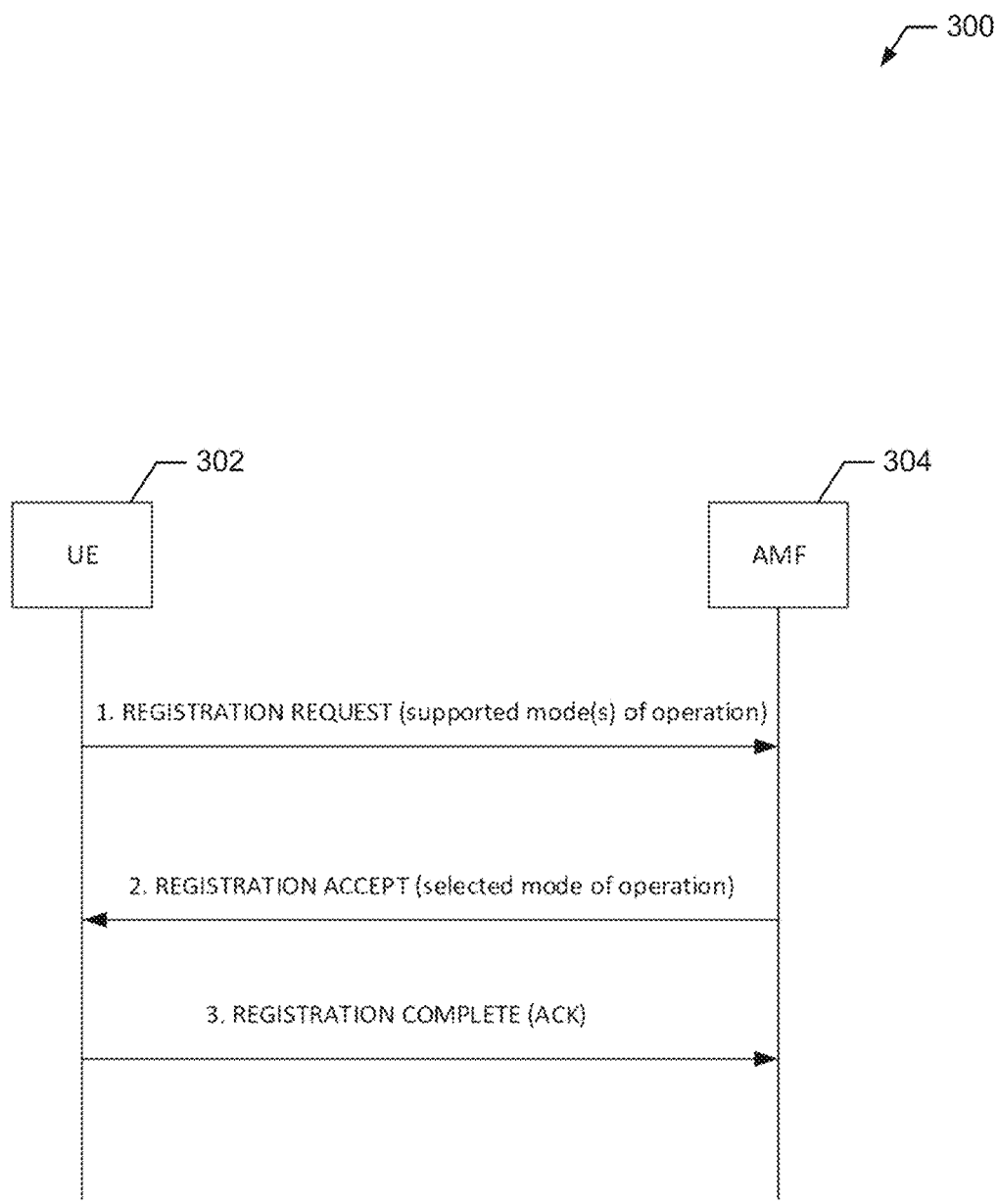
Figure 4:
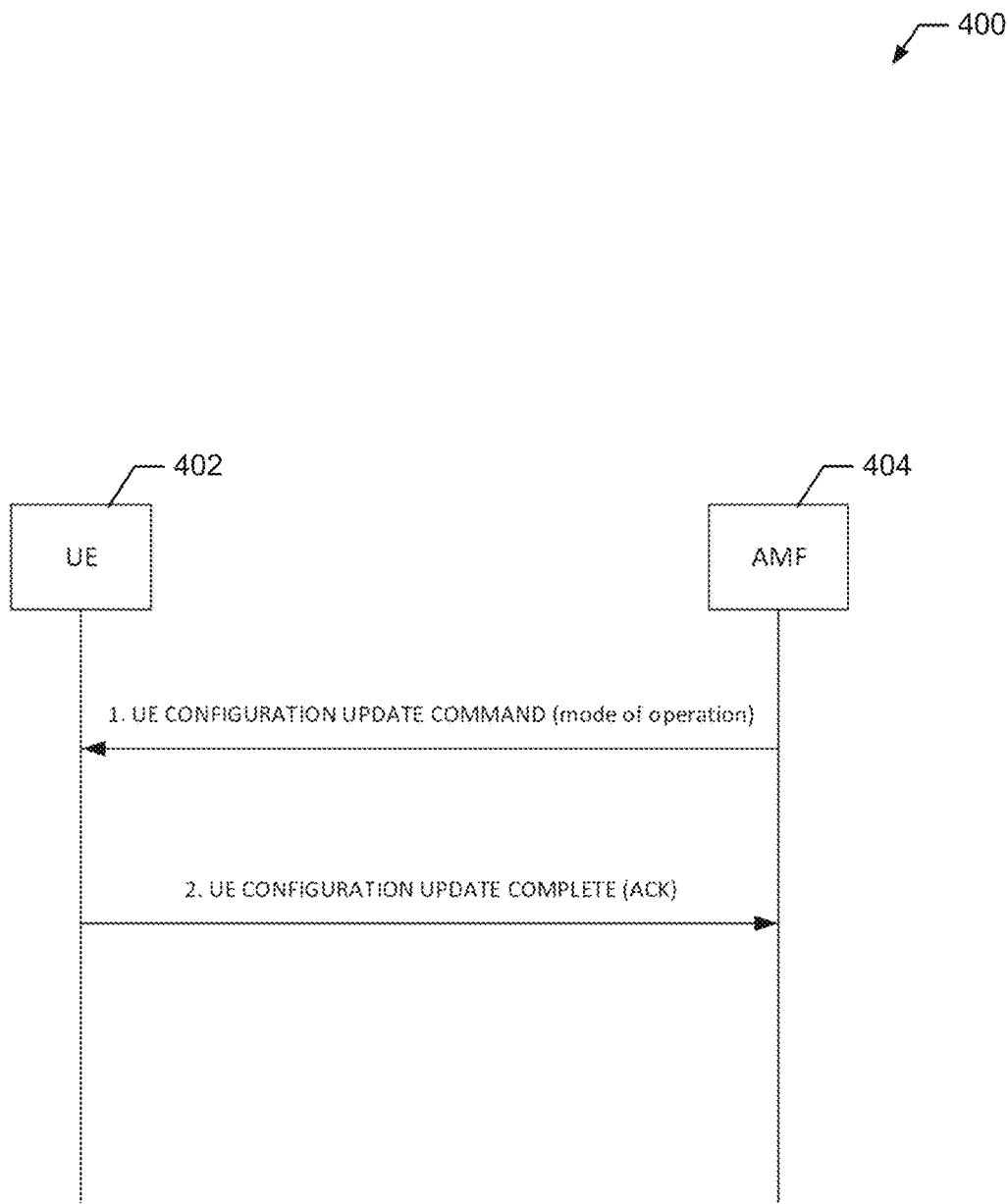
Figure 5:
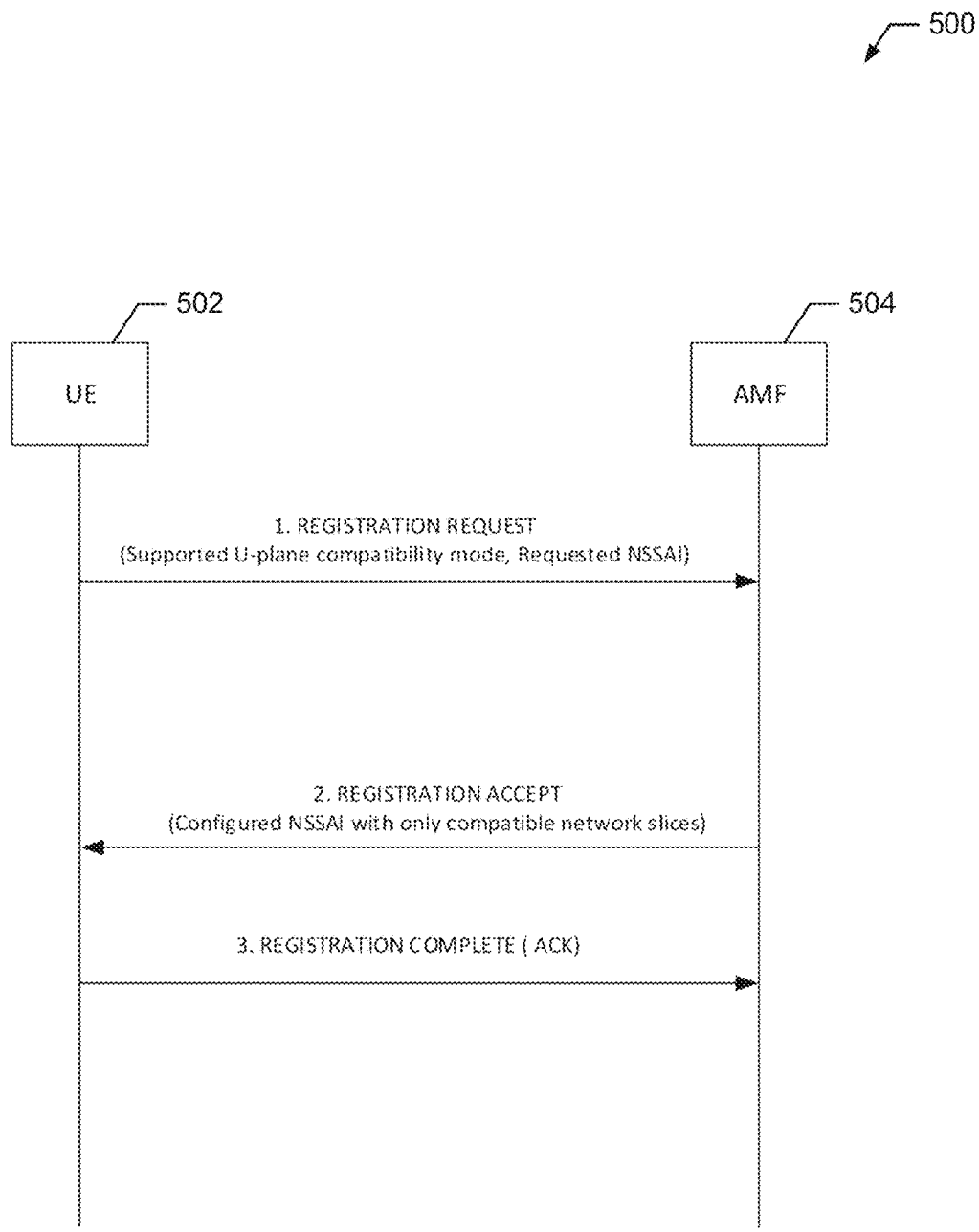
Figure 6:
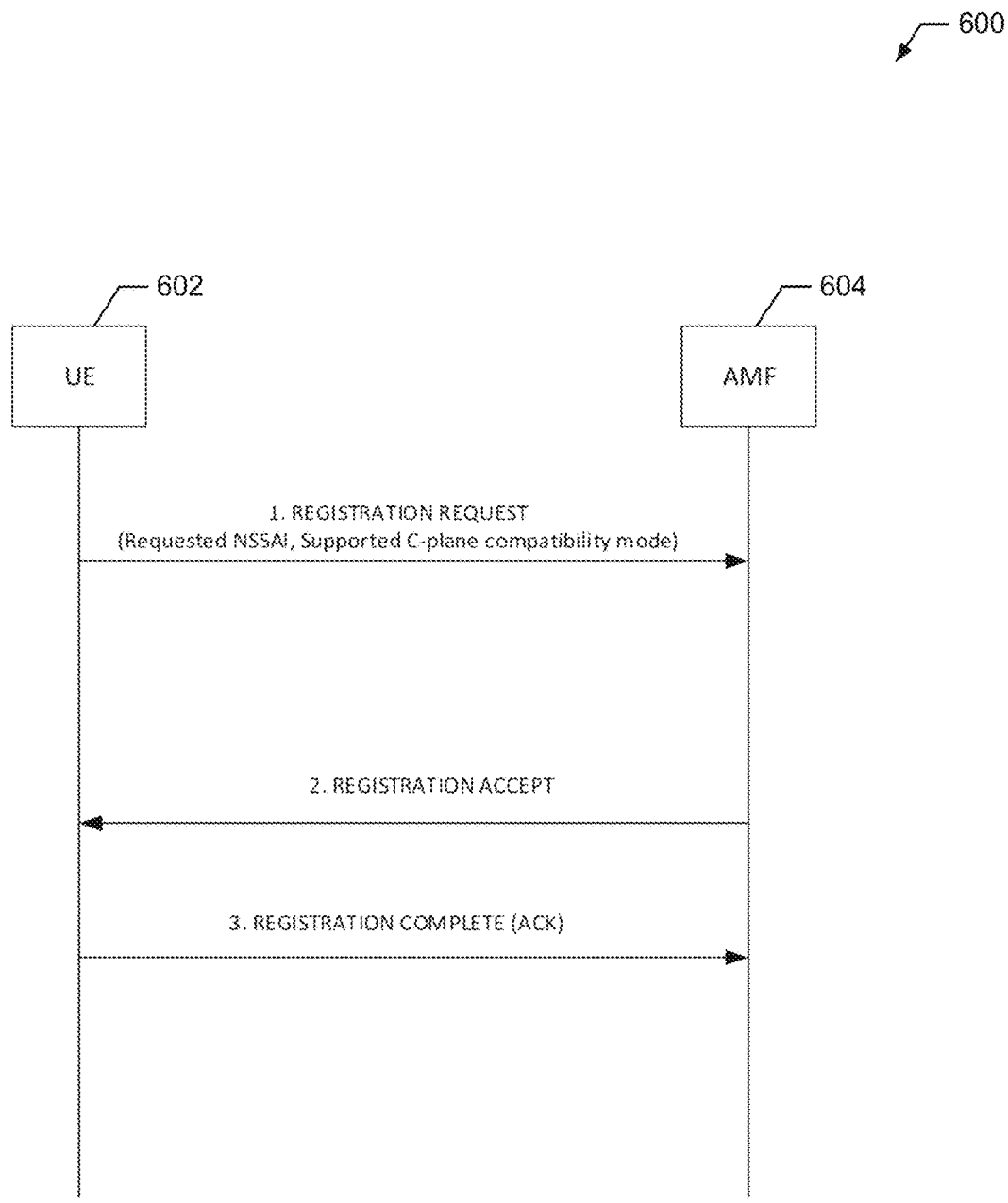
Figure 7:
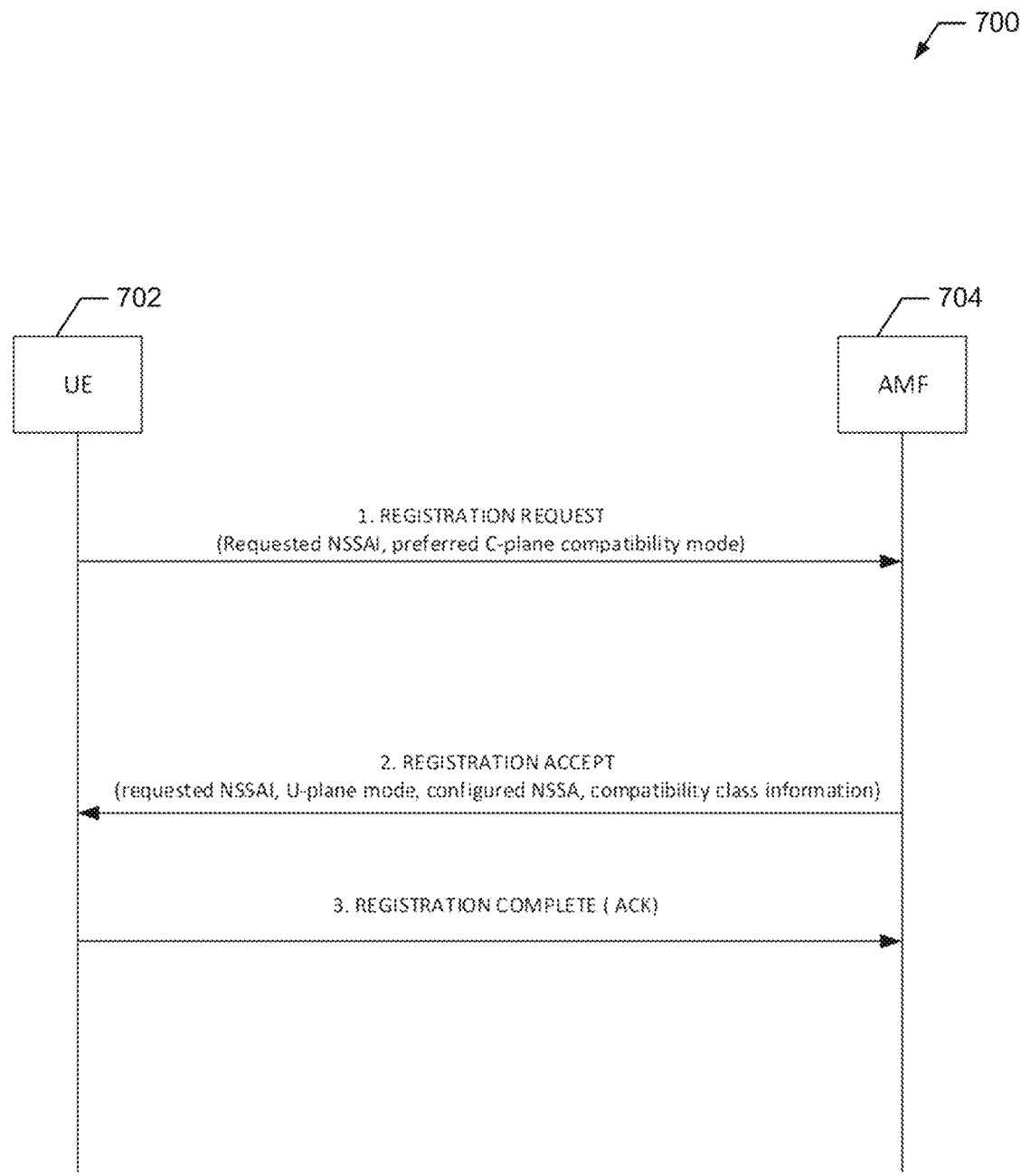
Figure 8:
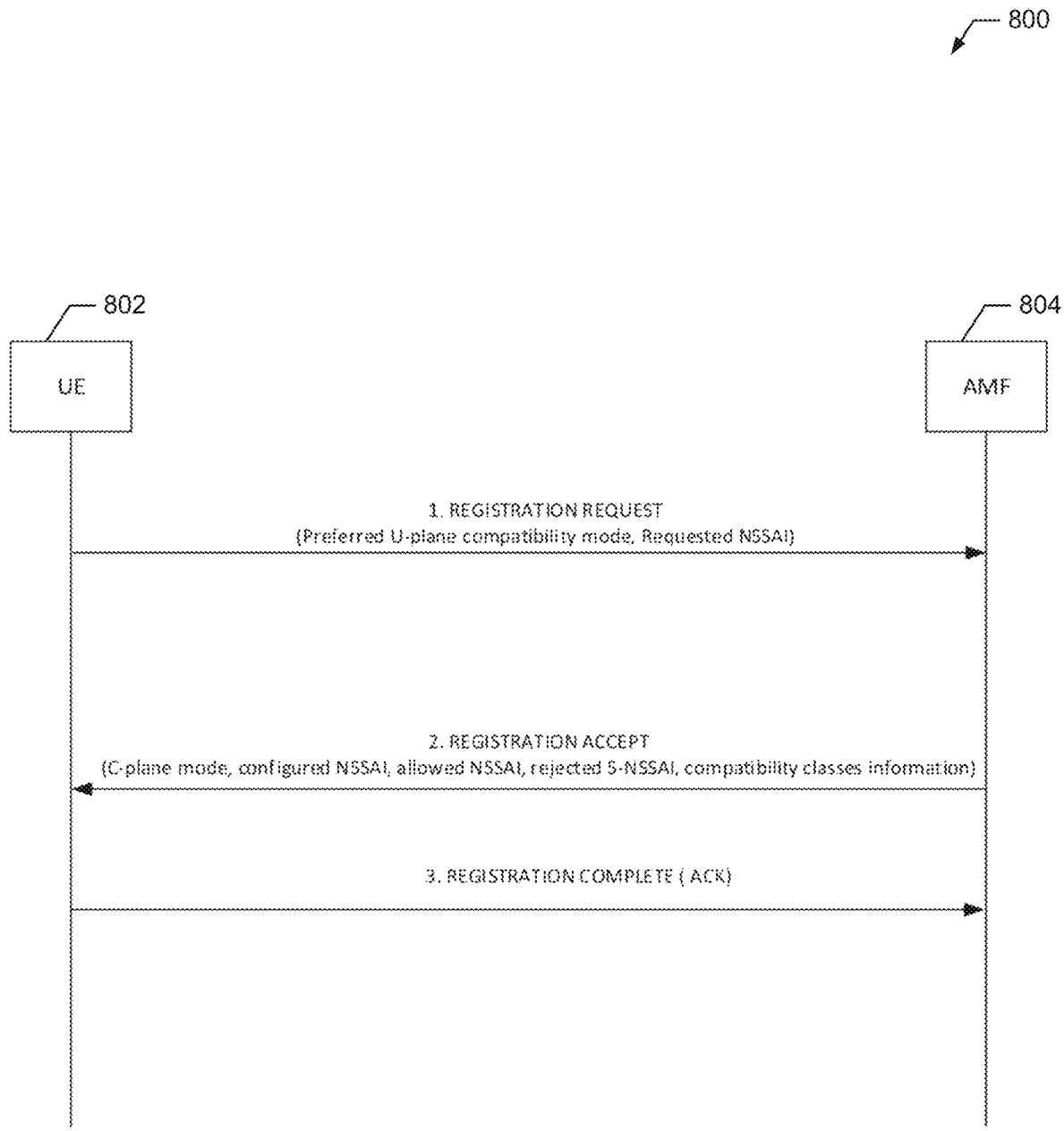
Figure 9:
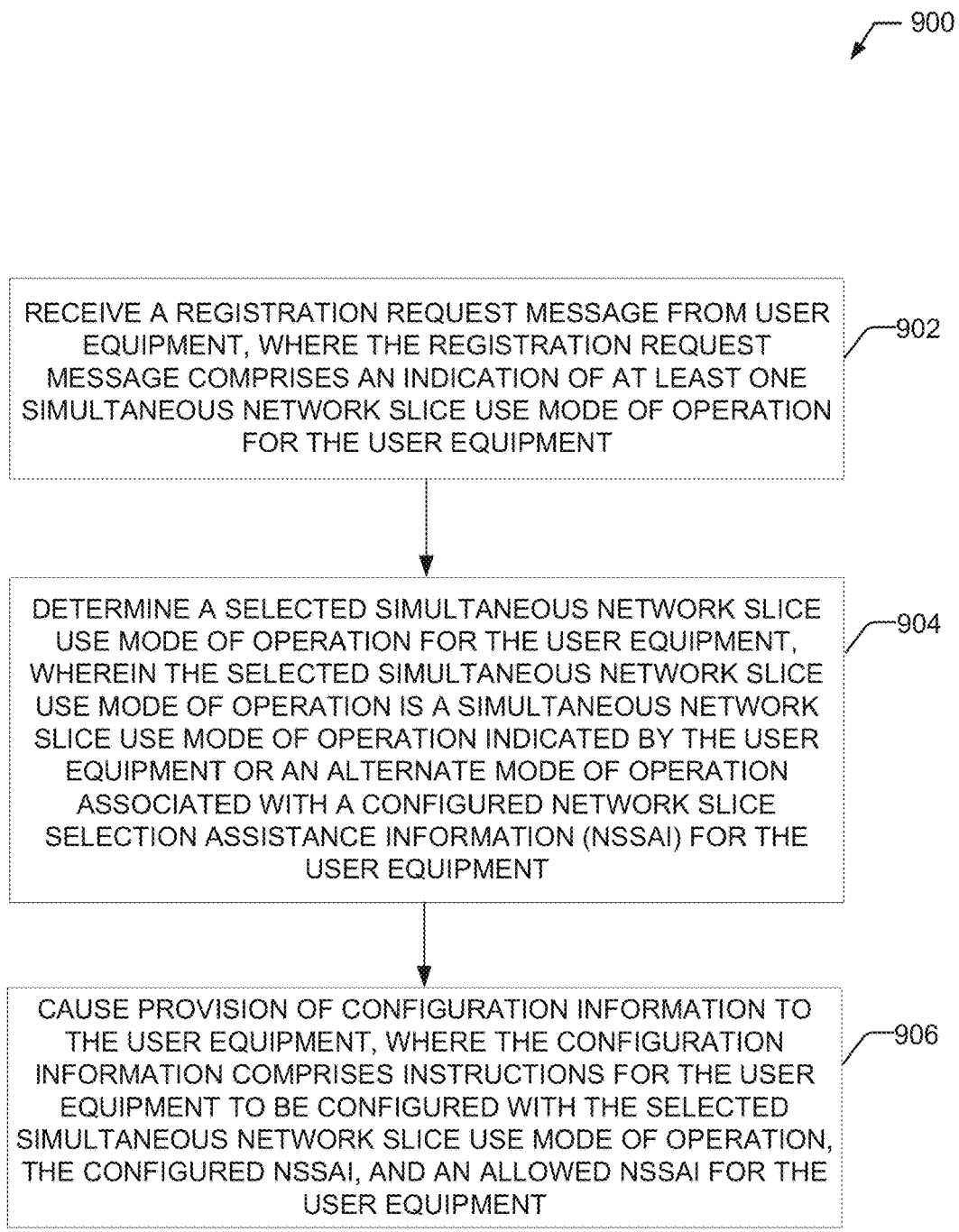
Figure 10:
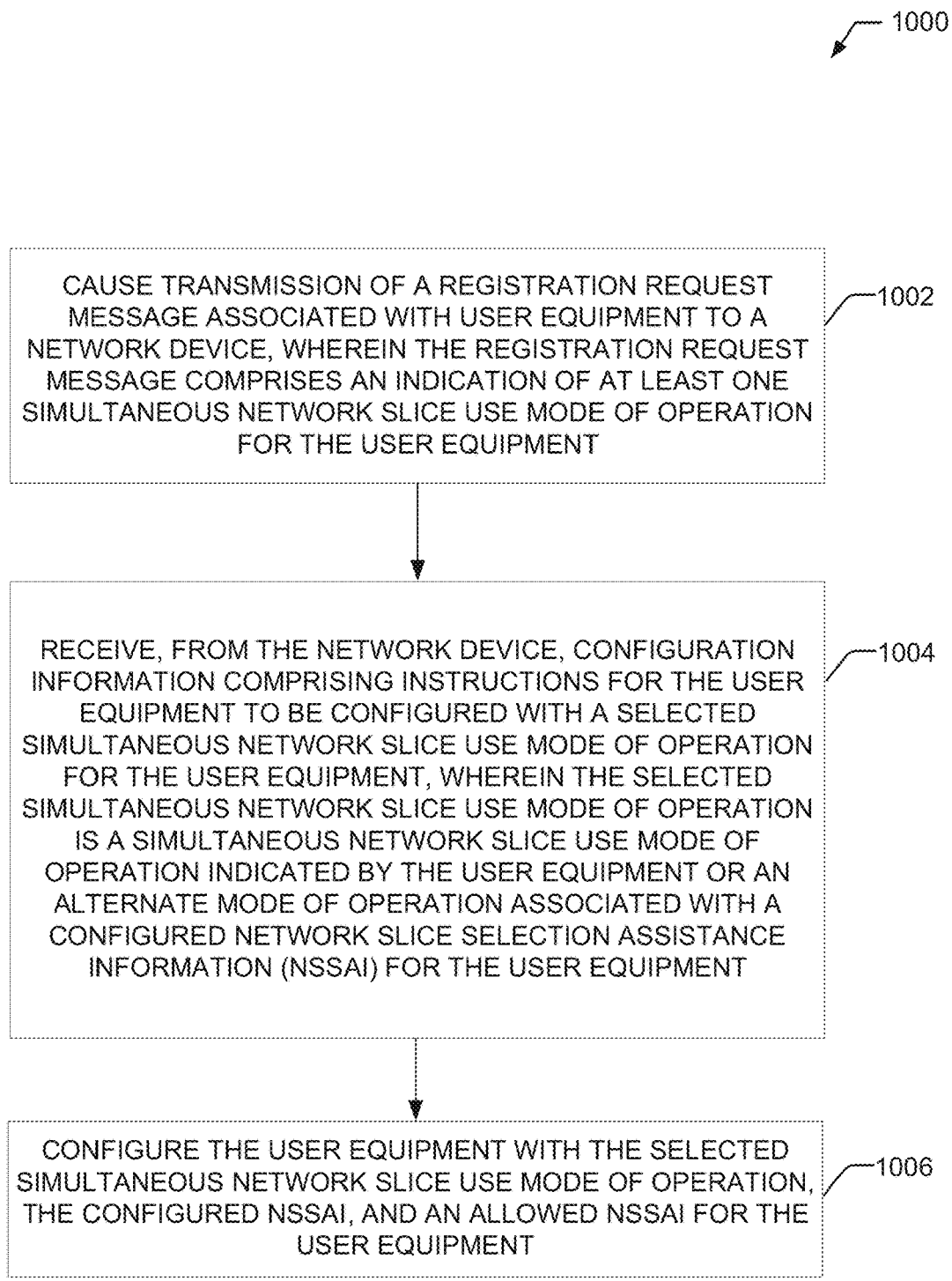

Having thus described certain example embodiments of the invention in general terms, reference will now be made to the accompanying drawings, which are not necessarily drawn to scale, and wherein:

FIG. 1 depicts an example system environment in which implementations in accordance with one or more example embodiments of the present disclosure;

FIG. 2 is a block diagram of an apparatus configured in accordance with one or more example embodiments of the present disclosure;

FIG. 3 illustrates example transmissions between a user equipment and a network entity in accordance with one or more example embodiments of the present disclosure;

FIG. 4 illustrates other example transmissions between a user equipment and a network entity in accordance with one or more example embodiments of the present disclosure;

FIG. 5 illustrates other example transmissions between a user equipment and a network entity in accordance with one or more example embodiments of the present disclosure;

FIG. 6 illustrates other example transmissions between a user equipment and a network entity in accordance with one or more example embodiments of the present disclosure;

FIG. 7 illustrates other example transmissions between a user equipment and a network entity in accordance with one or more example embodiments of the present disclosure;

FIG. 8 illustrates other example transmissions between a user equipment and a network entity in accordance with one or more example embodiments of the present disclosure;

FIG. 9 illustrates a flowchart illustrating operations performed, such as by the apparatus of FIG. 2, in order to provide for managing mode of access to a compatible set of network slices via a network entity, in accordance with one or more example embodiments of the present disclosure; and FIG. 10 illustrates a flowchart illustrating operations performed, such as by the apparatus of FIG. 2, in order to provide for managing mode of access to a compatible set of network slices via user equipment, in accordance with one or more example embodiments of the present disclosure.

DETAILED DESCRIPTION

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As defined herein, a "computer-readable storage medium," which refers to a physical storage medium (e.g., volatile or non-volatile memory device), may be differentiated from a "computer-readable transmission medium," which refers to an electromagnetic signal.

Third generation partnership project (3GPP) $5^{th}$ generation (5G) technology is a next generation of radio systems and network architecture that can deliver extreme broadband and ultra-robust, low latency connectivity. 5G technology improves a variety of telecommunication services offered to the end users, and helps to support massive broadband that delivers gigabytes of bandwidth per second on demand for both the uplink and downlink transmissions. Next generation systems, which utilize the 5G architecture, utilize virtualized radio access network (RAN) functions and core network functions.

Embodiments will be illustrated herein in conjunction with example communication systems and associated techniques for managing mode of access to a compatible set of network slices in a communication system. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3rd Generation Partnership Project (3GPP) system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the 3GPP TR 23.700-40. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

In a 5G network, network slicing is a concept for running multiple logical networks as virtually independent operations on a common physical infrastructure. A network slice is considered as an independent virtualized end-to-end network. Currently, standardization efforts are being made on simplifying the way network slices are defined, how user equipment register and deregister with a network slice, and how a protocol data unit (PDU) session is admitted to a network slice. However, under the current 3GPP specifications, enforcing such activities is complex and typically rests with the user equipment, meaning the network operator has little control over user equipment behavior during such activities. Furthermore, under the current 3GPP specifications, policies for use of a network slice by user equipment generally constrain network slice usage and/or PDU session capability of the user equipment. While the present disclosure may describe the invention in conjunction with a 5G communications system, the invention also applies to and comprises other networks and network technologies, such as 4G, LTE, 3G, etc. without limitation.

Methods, apparatuses and computer program products are provided in accordance with example embodiments to manage mode of access to a compatible set of network slices in a communication system.

In a communications system, such as a 5G system, a user equipment (UE) may subscribe to one or more network slices of the communication system. The UE subscription can include several network slices, each identified by network slice selection assistance information (NSSAI). A network slice may therefore be identified by single network slice selection assistance information (S-NSSAI). One or more of these S-NSSAIs may be marked as default S-NSSAIs. A default S-NSSAI may identify a network slice the UE can or should be using if the UE is not requesting any network slice in particular in the requested NSSA, e.g., before it is configured with a Configured NSSAI (e.g., an allowed NSSAI). Under current standards, such as those mentioned herein, and in an instance in which the UE has been configured with a Configured NSSAI, these current standards leave the UE totally free to request any of these based on local logic. As such, there is no constraint on the behavior according to which the UE requests one or more of the Configured NSSAI. Under the current standards, the only mechanism available is for the home public land mobile network (HPLMN) of the UE to configure the UE with a Default configured NSSAI the UE would use when it has not yet received a Configured NSSAI in the Serving PLMN.

However, there are several problems with this approach, which includes that the UE may, at any time, omit to request a S-NSSAI the operator intends the UE to use to, e.g., provide it with essential services or updates. Also, many UEs on the market today are configured to, in such instances, proceed to request all S-NSSAIs in the configured NSSAI without any regard for the actual need, which may mean that, for instance, operators will find no use to deploy network slice-specific Access and Mobility management Functions (AMFs) as all UEs that behave in this way will typically end up in AMFs that support all the S-NSSAIs at the same time. Such a circumstance for the network may mean that only general AMFs are used and must either switch between network slices or be configured for functioning within or between multiple network slices, which can lead to inefficient network messaging, a lack of specialized network slicing, inefficient signaling of NSSAI, and/or the like. For instance, under the current standards and related network/UE configurations, a UE that is configured for a massive internet of things (MIoT) slice and an enhanced mobile broadband (eMBB) slice, will typically or always end up in an AMF that supports both, even if the UE seldom needs to use the eMBB (e.g., only when the UE needs its software to be updated). AMFs specific for MIoT have been one of the main drives of network slicing and, e.g., in an evolved packet system (EPS) of Dedicated core networks, were defined to, e.g., support mobility management entities (MMEs) devoted to internet of things (IoT) technology and connectivity mainly or only (e.g., MMEs that manage small amounts of data and/or seldom connect a large number of devices, or that support small data transmission on a control plane).

According to the current standards, if the UE has access to or is configured for access to greater than or equal to a particular number of network slices, such as greater than eight network slices, then the UE can or will apply a logic that is outside of network operator control in deciding which of the eight or more network slices not to request.

Conversely, some UEs may decide to only request one network slice in association with an application and then abandon the requested network slice after the application that needed it has stopped using it. Some operators may want to minimize this type of behavior if the applications are launched and released rather frequently. Operators therefore have no way to enforce a network slice registration/deregistration behavior for UEs or UE behavior regarding associating a PDU session with a network slice. According to the current relevant standards, an operator that only deploys AMFs that serve all network slices at the same time, for instance, may indeed want to enforce all UEs to minimize the UE joining and leaving network slices by registration procedures, as indeed they would be at least quasi pointless in their network—unless, for instance, some of the network slices also have a limitation on the number of UEs connected, require extra authentication and authorization for a UE to connect, or have a default Access Point Name (APN).

As such, according to the current relevant standards, the operator typically have no way to configure UE, e.g., with a hysteresis timer, to cause the UE to determine when to abandon a network slice after the last application that used that network slice stops doing so. If applications, e.g., operated by a UE, join and leave network slices frequently (e.g., join and leave a network slice greater than a certain number of times per unit time) this may cause undesirable signaling load.

Moreover, according to the current relevant standards, when a UE is given an ability to register with any combination of network slices, the UE is then constrained to only use PDU sessions that belong to network slices that are defined to be mutually compatible. For instance, the UE and network generally determine compatibility based on information that is part of subscription data and/or information provided to the UE. Additionally, according to current relevant standards, a UE is generally not capable of simultaneous registration with a set of network slices. It is therefore desirable to provide simultaneous use at a level of user plane connectivity capability and to also enforce compatibility at a time of registration to network slices in a network and/or per set of UEs.

As such, described herein are methods, apparatuses, and computer program products for managing mode of access to a compatible set of network slices to resolve some or all of the described limitations of the current relevant standards, and/or other limitations of the current relevant standards. Such methods, apparatuses, and computer program products are thus described that allow a user plane-centric simultaneous network slice use mode and a control plane-centric simultaneous network slice use mode in a network and/or by UE. A UE that operates in the user plane-centric simultaneous network slice use mode shall can establish priority PDU sessions that one or more UE applications are using so as to minimize triggering incompatibility rules. A UE that operates in the control plane-centric simultaneous network slice use mode can register with priority with network slices that one or more UE applications are using so as to minimize triggering incompatibility rules. By managing mode of access to a compatible set of network slices (e.g., by the network operator, network slice operator, APN operator, AMF operator, or another network entity), it is possible to tune UE behavior in a network, a network slice, and/or a network entity in a manner tailored to a particular network deployment. For example, by managing mode of access to a compatible set of network slices (e.g., by the network operator, network slice operator, APN operator, AMF operator, or another network entity), it is possible to establish an optimal mode of operation for a UE based on UE behavior and/or network behavior. In some embodiments, registration and/or configuration update procedures can be employed to establish a mode of operation for a UE. Additionally, by managing mode of access to a compatible set of network slices (e.g., by the network operator, network slice operator, APN operator, AMF operator, or another network entity), it is possible to minimize signaling load and/or reduce bandwidth being dedicated to such signaling, registration/deregistration and/or other such activities. A similar approach can also be adopted inside a network slice to control which PDU sessions shall be established and which can be established or should be established, e.g., only upon an application requesting them. According to the current relevant standards, there is currently no requirement for a UE to establish PDU sessions with a Data Network Name (DNN), e.g., only when an application needs it, if these are configured in a UE route selection policy (URSP). Said otherwise, the described approach allows operators to control UE behavior in forming a Requested NSSAI and in requesting PDU sessions inside a network slice.

In some embodiments, a UE may indicate one or more preferred mode of operations (e.g., one or more mode of operations supported by the UE). Furthermore, in some embodiments, if the network requests a mode of operation that the UE does not support for certain network slices, the network may decide to provide the UE with a compatible set of slices and/or to update the UE configuration such that the UE employs a set of slices more suitable with a behavior supported by the UE and/or the network. For example, a UE that only supports a user plane compatibility mode may be provided with a set of compatible network slices if the network prefers that the UE employs the set of compatible network slices (e.g., if the network determines that network behavior satisfies a defined criterion in response to the UE employing the set of compatible network slices).

In some embodiments, if a mode of operation for a UE updates an existing and/or already employed mode of operation for the UE (e.g., while the UE has already registered with one or more network slices or established one or more PDU sessions), the UE can determine compatibility with respect to one or more existing registered network slices and/or one or more established PDU sessions. Additionally, in some embodiments, the UE can adjust the one or more existing registered network slices and/or the one or more established PDU sessions based on the mode of operation and/or data associated with one or more applications running on the UE (e.g., data associated with one or more applications on the UE that are determined to be most active).

In some embodiments, a network entity and/or a UE can be configured such that an operator of the network can control UE behavior. In some embodiments, in addition to being capable of providing the Configured NSSAI and URSP to the UE, the network entity may also provide the UE with configuration information that instructs the UE to configure the UE to employ a set of network slices suitable to an indicated behavior and/or to establish PDU sessions.

FIG. 1 depicts an example communication system environment in which implementations in accordance with an example embodiment of the present disclosure may be performed. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

In one or more embodiments, the system environment 100 is a network environment. As shown in FIG. 1, the system environment 100 includes one or more user equipment (UE) 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems. The system environment 100, as depicted in FIG. 1, also includes one or more access points 104a and 104b, such as one or more base stations, including but not limited to node Bs, evolved Node Bs (eNB), or the like. In some embodiments, the one or more access points 104a and 104b are one or more cellular access points. In some embodiments, the one or more access points 104a and 104b may define and/or service one or more cells. The one or more access points 104a and 104b may, in turn, be in communication with a network 106, such as a core network via a gateway, such that the one or more access points 104a and 104b establish cellular radio access networks by which the user equipment 102 may communicate with the network 106. The system environment 100 of FIG. 1 may include a plurality of different cellular radio access cells and/or networks or parts of such networks including, for example, a 5G radio access network, an LTE (Long-Term Evolution) radio access network, a UMTS (universal mobile telecommunications system) radio access network, etc. In some example implementations, equipment and other infrastructure associated with multiple different cellular radio access networks may be located at or near structures and/or other equipment associated with a particular access point, such as the one or more access points 104a and 104b.

In some implementations of the system environment 100, the cellular radio access networks serviced by the one or more access points 104a and 104b, and any other access points in a given area are identical, in the sense that as the user equipment 102 moves from an area serviced by access point 104a to an area serviced by access point 104b. The user equipment 102 is able to access the network 106 via a radio access network provided across the one or more access points 104a and 104b. Although not shown, the system environment 100 may also include a controller associated with one or more of the access points 104a and 104b, such as, base stations, for example, so as to facilitate operation of the access points 104a and 104b and management of the user equipment 102 in communication therewith. As shown in FIG. 1, the system environment 100 may also include one or more wireless local area networks (WLANs), each of which may be serviced by a WLAN access point 108 configured to establish wireless communications with the user equipment 102. As such, the user equipment 102 may communicate with the network 106 via a WLAN access point as shown in solid lines in FIG. 1, or, alternatively, via an access point (e.g., access point 104a or access point 104b) as shown in dashed lines. The radio access networks as well as the core networks may consist of additional network elements as routers, switches, servers, gateways, and/or controllers.

In this regard, the implementation and/or allocation of a network slice within the system environment 100 can be accomplished by an apparatus 200 as depicted in FIG. 2. The apparatus 200 may be embodied by and/or incorporated into one or more UEs, such as user equipment 102, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, including but not limited to a smartphone, a tablet computer, or the like, for example.

In some embodiments, the system environment 100 may include one or more of the following network functions (NF): Authentication Server Function (AUSF), Access and Mobility Management Function (AMF), Data Network (DN), e.g. operator services, Internet access or 3rd party services, Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), UE radio Capability Management Function (UCMF), Application Function (AF), User Equipment (UE), Next Generation-Radio Access Network (NG-RAN), 5G-Equipment Identity Register (5G-EIR), Network Data Analytics Function (NWDAF), and Charging Function (CHF). The system environment may further comprise the following network entities: Service Communication Proxy (SCP) and Security Edge Protection Proxy (SEPP).

Regardless of the manner in which the apparatus 200 is embodied, the apparatus 200 of an example embodiment is configured to include or otherwise be in communication with a processing circuitry 202 and a memory 204. In some embodiments, the apparatus 200 is configured to additionally include or otherwise be in communication with a communication interface 206. In some embodiments, the processing circuitry 202 may be in communication with the memory 204 via a bus for passing information among components of the apparatus 200. The memory 204 may be non-transitory and may include, for example, one or more volatile and/or non-volatile memories. In other words, for example, the memory 204 may be an electronic storage device (e.g., a computer readable storage medium) comprising gates configured to store data (e.g., bits) that may be retrievable by a machine (e.g., a computing device like the processing circuitry 202). The memory 204 may be configured to store information, data, content, applications, instructions, or the like for enabling the apparatus 200 to carry out various functions in accordance with an example embodiment of the present disclosure. For example, the memory 204 could be configured to buffer input data for processing by the processing circuitry 202. Additionally or alternatively, the memory 204 could be configured to store instructions for execution by the processing circuitry 202.

As described above, the apparatus 200 may be embodied by a computing device. However, in some embodiments, the apparatus 200 may be embodied as a chip or chip set. In other words, the apparatus 200 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 200 may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 202 may be embodied in a number of different ways. For example, the processing circuitry 202 may be embodied as one or more of various hardware processing means including a processor, such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry 202 may include one or more processing cores configured to perform independently. A multi-core processor may enable multiprocessing within a single physical package. Additionally or alternatively, the processing circuitry 202 may include one or more processors configured in tandem via the bus to enable independent execution of instructions, pipelining and/or multithreading.

In an example embodiment, the processing circuitry 202 may be configured to execute instructions stored in the memory 204 or otherwise accessible to the processing circuitry 202. Alternatively or additionally, the processing circuitry 202 may be configured to execute hard coded functionality. As such, whether configured by hardware or software methods, or by a combination thereof, the processing circuitry 202 may represent an entity (e.g., physically embodied in circuitry) capable of performing operations according to an embodiment of the present disclosure while configured accordingly. Thus, for example, when the processing circuitry 202 is embodied as an ASIC, FPGA or the like, the processing circuitry 202 may be specifically configured hardware for conducting the operations described herein. Alternatively, as another example, when the processing circuitry 202 is embodied as an executor of software instructions, the instructions may specifically configure the processing circuitry 202 to perform the algorithms and/or operations described herein when the instructions are executed. However, in some cases, the processing circuitry 202 may be a processor of a specific device (e.g., a pass-through display or a mobile terminal) configured to employ an embodiment of the present disclosure by further configuration of the processing circuitry 202 by instructions for performing the algorithms and/or operations described herein. The processing circuitry 202 may include, among other things, a clock, an arithmetic logic unit (ALU) and logic gates configured to support operation of the processing circuitry 202.

The apparatus 200 may optionally include the communication interface 206. The communication interface 206 may be any means such as a device or circuitry embodied in either hardware or a combination of hardware and software that is configured to receive and/or transmit data from/to a network and/or any other device or module in communication with the apparatus. In this regard, the communication interface 206 may include, for example, an antenna (or multiple antennas) and supporting hardware and/or software for enabling communications with a wireless communication network. Additionally or alternatively, the communication interface 206 may include the circuitry for interacting with the antenna(s) to cause transmission of signals via the antenna(s) or to handle receipt of signals received via the antenna(s). In some environments, the communication interface 206 may alternatively or also support wired communication. As such, for example, the communication interface 206 may include a communication modem and/or other hardware/software for supporting communication via cable, digital subscriber line (DSL), universal serial bus (USB) or other mechanisms.

Provided hereinbelow, are example transmissions between UE and a network entity (e.g., a network device, a network component, etc.). The below example transmissions provide the foreseen steps or messaging needed.

In some embodiments, a UE may indicate one or more mode of operations supported by the UE. If the network requests a particular mode of operation that the UE does not support for certain network slices, in some embodiments, the network may provide the UE with a compatible set of slices and/or may update the UE configuration so the UE employs a set of slices more suitable with a UE behavior supported by the UE and/or the network. For instance, in an example embodiment where a UE supports a user plane compatibility mode, the UE may be provided with a set of compatible network slices only if the network determines that the UE should employ the set of compatible network slices. In an example embodiment where a UE supports all modes of operation, the UE may indicate a preference for a mode of operation. Furthermore, in some embodiments, the UE may receive an indication to operate using a preferred UE behavior if the network determines that the preferred UE behavior is compatible with the network behavior.

FIG. 3 illustrates example transmissions between a UE 302 and an AMF 304 of a communication system for registering the UE 302 with one or more network slices, according to one or more embodiments. In some embodiments, the UE 302 can send a REGISTRATION REQUEST message to the AMF 304, at 1. In some embodiments, the REGISTRATION REQUEST message can include one or more supported modes of operation for the UE 302. The AMF 304, or another suitable network entity of the communication system, can determine, in some embodiments, UE behavior for the one or more supported modes of operation included in the REGISTRATION REQUEST message. Additionally, in some embodiments, the AMF 304, or another suitable network entity of the communication system, can determine, based on a comparison between the UE behavior and network behavior associated with a set of network slices of the communications system, a selected mode of operation for the UE 302. In an example embodiment, the selected mode of operation is the mode of operation for the UE 302 or an alternate mode of operation with configured NSSAI (e.g., allowed NSSAI) for the UE 302. In some embodiments, the AMF 304, or another suitable network entity of the communication system, can cause provision of configuration information to the UE 302. In some embodiments, the configuration information can include instructions for the UE 302 to be configured with the selected mode of operation. For instance, in some embodiments, the AMF 304, or another suitable network entity of the communication system, can send a REGISTRATION ACCEPT message to the UE 302, at 2. In some embodiments, the REGISTRATION ACCEPT message can include an indication of the selected mode of operation (e.g., the instructions for the UE 302 to be configured with the selected mode of operation).

In some embodiments, the UE 302 can send a REGISTRATION COMPLETE message to the AMF 304, at 3. In some embodiments, the REGISTRATION COMPLETE message can include an acknowledgment (e.g., ACK) that the UE 302 is configured with the selected mode of operation. For instance, in an example embodiment, the UE 302 can be configured with the selected mode of operation in response to receiving the REGISTRATION ACCEPT message. Furthermore, in response to being configured with the selected mode of operation, the UE 302 can send the REGISTRATION COMPLETE message to the AMF 304. In some embodiments, even if the UE 302 is not yet configured with the selected mode of operation, the UE 302 can return a REGISTRATION COMPLETE message to the AMF 304. As such, as part of the consideration, by the AMF 304 or other network entity, about whether the UE 302 should be registered with the communication system using a certain mode of operation (e.g., via one or more network slices, via one or more PDU sessions, via one or more core network, via the AMF 304, etc.), the AMF 304 or other network entity can determine a mode of operation for the UE 302.

In some embodiments, if a mode of operation updates an existing and already used mode of operation (e.g., while the UE has already registered with one or more network slices or established one or more PDU sessions), the UE can determine compatibility with the existing registered one or more network slices and/or the established one or more PDU sessions. Additionally, in some embodiments, the UE can adjust the registered one or more network slices and/or the established one or more PDU sessions based on the mode of operation and/or data associated with one or more applications running on the UE (e.g., data associated with one or more applications on the UE that are determined to be most active).

FIG. 4 illustrates example transmissions between a UE 402 and an AMF 404 of a communication system for registering the UE 402 with one or more network slices, according to one or more embodiments. In some embodiments, the AMF 404 can send a UE CONFIGURATION UPDATE COMMAND message to the UE 402, at 1. In some embodiments, the UE CONFIGURATION UPDATE COMMAND message can include a mode of operation (e.g., a selected mode of operation) for the UE 402. For instance, in some embodiments, the UE CONFIGURATION UPDATE COMMAND message can include instructions for the UE 402 to be configured with the mode of operation (e.g., the selected mode of operation). In some embodiments, the AMF 404, or another suitable network entity of the communication system, can determine the mode of operation included in the UE CONFIGURATION UPDATE COMMAND message. Additionally, in some embodiments, the UE CONFIGURATION UPDATE COMMAND message can additionally include a configured NSSAI (e.g., an allowed NSSAI) for the UE 402. In some embodiments, the UE 402 can send a UE CONFIGURATION UPDATE COMPLETE message to the AMF 404, at 2. In some embodiments, the UE CONFIGURATION UPDATE COMPLETE message can include an acknowledgment (e.g., ACK) that the UE 402 is configured with the mode of operation (e.g., the selected mode of operation) indicated in the UE CONFIGURATION UPDATE COMMAND message. For instance, in an example embodiment, the UE 402 can be configured with the mode of operation (e.g., the selected mode of operation) indicated in the UE CONFIGURATION UPDATE COMMAND message and/or the configured NSSAI for the UE 402 in response to receiving the UE CONFIGURATION UPDATE COMMAND message.

In an example embodiment, a UE supports only a first mode of operation (e.g., a U-plane mode) and a communications network is configured to use a second mode of operation (e.g., a C-plane mode). As such, in some embodiments, an AMF provides only compatible network slices in a configured NSSAI to avoid having the UE register with incompatible slices.

FIG. 5 illustrates example transmissions between a UE 502 and an AMF 504 of a communication system for registering the UE 502 with one or more network slices, according to one or more embodiments. In some embodiments, the UE 502 can send a REGISTRATION REQUEST message to the AMF 504, at 1. In some embodiments, the REGISTRATION REQUEST message can include a supported U-plane compatibility mode of operation for the UE 502. Additionally, in some embodiments, the REGISTRATION REQUEST message can include a requested NSSAI. The AMF 504, or another suitable network entity of the communication system, can determine, in some embodiments, UE behavior for the supported U-plane compatibility mode of operation included in the REGISTRATION REQUEST message. In some embodiments, the AMF 504, or another suitable network entity of the communication system, can be configured to employ a C-plane compatibility mode. Additionally, in some embodiments, the AMF 504, or another suitable network entity of the communication system, can determine, based on a comparison between the UE behavior and network behavior associated with the C-plane compatibility mode, a selected mode of operation for the UE 502. In an example embodiment, the selected mode of operation is the U-plane compatibility mode of operation for the UE 502 or an alternate mode of operation with configured NSSAI (e.g., allowed NSSAI) for the UE 502 that is compatible with the U-plane compatibility mode of operation. In some embodiments, the AMF 504, or another suitable network entity of the communication system, can cause provision of configuration information to the UE 502. In some embodiments, the configuration information can include instructions for the UE 502 to be configured with the configured NSSAI for the UE 502. For instance, in some embodiments, the AMF 504, or another suitable network entity of the communication system, can send a REGISTRATION ACCEPT message to the UE 502, at 2. In some embodiments, the REGISTRATION ACCEPT message can include an indication of the configured NSSAI for the UE 502. In some embodiments, the REGISTRATION ACCEPT message can additionally include an indication of one or more compatible network slices (e.g., only one or more compatible network slices for the UE 502).

In some embodiments, the UE 502 can send a REGISTRATION COMPLETE message to the AMF 504, at 3. In some embodiments, the REGISTRATION COMPLETE message can include an acknowledgment (e.g., ACK) that the UE 502 is configured with the configured NSSAI. For instance, in an example embodiment, the UE 502 can be configured with the configured NSSAI and/or the one or more compatible network slices in response to receiving the REGISTRATION ACCEPT message. Furthermore, in response to being configured with the configured NSSAI and/or the one or more compatible network slices, the UE 502 can send the REGISTRATION COMPLETE message to the AMF 504. In some embodiments, even if the UE 502 is not yet configured with the configured NSSAI and/or the one or more compatible network slices, the UE 502 can return a REGISTRATION COMPLETE message to the AMF 504. As such, as part of the consideration, by the AMF 504 or other network entity, about whether the UE 502 should be registered with the communication system using a certain mode of operation (e.g., via a configured NSSAI, via one or more network slices, via one or more PDU sessions, via one or more core network, via the AMF 504, etc.), the AMF 504 or other network entity can determine a mode of operation for the UE 502. Furthermore, the UE 502 can behave with no constraint with respect to registration and/or PDU session establishment, and the AMF 504 can proceed without checking compatibility as the network slices the UE 502 is provided in the configured NSSAI and are all mutually compatible.

In another example embodiment, a UE supports only a first mode of operation (e.g., a C-plane mode) and a communications network is configured to use a second mode of operation (e.g., a U-plane mode). As such, in some embodiments, an AMF provides no compatibility class info and only enforces locally the compatibility among PDU sessions (e.g., the UE would not be able to determine PDU session compatibility as it does not support U-plane mode).

FIG. 6 illustrates example transmissions between a UE 602 and an AMF 604 of a communication system for registering the UE 602 with one or more network slices, according to one or more embodiments. In some embodiments, the UE 602 can send a REGISTRATION REQUEST message to the AMF 604, at 1. In some embodiments, the REGISTRATION REQUEST message can include a supported C-plane compatibility mode of operation for the UE 602. Additionally, in some embodiments, the REGISTRATION REQUEST message can include a requested NSSAI. The AMF 604, or another suitable network entity of the communication system, can determine, in some embodiments, UE behavior for the supported C-plane compatibility mode of operation included in the REGISTRATION REQUEST message. In some embodiments, the AMF 604, or another suitable network entity of the communication system, can be configured to employ a U-plane compatibility mode. Additionally, in some embodiments, the AMF 604, or another suitable network entity of the communication system, can determine, based on a comparison between the UE behavior and network behavior associated with the U-plane compatibility mode, a selected mode of operation for the UE 602. In an example embodiment, the selected mode of operation is the C-plane compatibility mode of operation for the UE 602 or an alternate mode of operation with configured NSSAI (e.g., allowed NSSAI) for the UE 602 that is compatible with the C-plane mode of operation. In some embodiments, the AMF 604, or another suitable network entity of the communication system, can cause provision of configuration information to the UE 602. In some embodiments, the configuration information can include instructions for the UE 602 to be configured with the selected mode of operation and/or the configured NSSAI for the UE 602. For instance, in some embodiments, the AMF 604, or another suitable network entity of the communication system, can send a REGISTRATION ACCEPT message to the UE 602, at 2. In some embodiments, the REGISTRATION ACCEPT message can include an indication of the selected mode of operation and/or the configured NSSAI for the UE 602. In some embodiments, the REGISTRATION ACCEPT message can additionally include an indication of one or more compatible network slices (e.g., only one or more compatible network slices for the UE 602).

In some embodiments, the UE 602 can send a REGISTRATION COMPLETE message to the AMF 604, at 3. In some embodiments, the REGISTRATION COMPLETE message can include an acknowledgment (e.g., ACK) that the UE 602 is configured with the selected mode of operation and/or the configured NSSAI. For instance, in an example embodiment, the UE 602 can be configured with the selected mode of operation, the configured NSSAI and/or the one or more compatible network slices in response to receiving the REGISTRATION ACCEPT message. Furthermore, in response to being configured with the selected mode of operation, the configured NSSAI and/or the one or more compatible network slices, the UE 602 can send the REGISTRATION COMPLETE message to the AMF 604. In some embodiments, even if the UE 602 is not yet configured with the selected mode of operation, the configured NSSAI and/or the one or more compatible network slices, the UE 602 can return a REGISTRATION COMPLETE message to the AMF 604. As such, as part of the consideration, by the AMF 604 or other network entity, about whether the UE 602 should be registered with the communication system using a certain mode of operation (e.g., via a configured NSSAI, via one or more network slices, via one or more PDU sessions, via one or more core network, via the AMF 604, etc.), the AMF 604 or other network entity can determine a mode of operation for the UE 602. Furthermore, the UE 602 can behave with no constraint with respect to registration and/or PDU session establishment, and the AMF 604 can reject one or more PDU sessions in response to a determination that the one or more PDU sessions are incompatible based on information employed by the AMF 604.

In another example embodiment, a UE supports a first mode of operation (e.g., a C-plane mode) and a second mode of operation (e.g., a U-plane mode) but indicates a preference for the first mode of operation (e.g., the C-plane mode), and a communications network is configured to use the second mode of operation (e.g., the U-plane mode). As such, in some embodiments, an AMF provides compatibility class info and the UE is configured to apply one or more compatibility rules for one or more PDU sessions.

FIG. 7 illustrates example transmissions between a UE 702 and an AMF 704 of a communication system for registering the UE 702 with one or more network slices, according to one or more embodiments. In some embodiments, the UE 702 can send a REGISTRATION REQUEST message to the AMF 704, at 1. In some embodiments, the REGISTRATION REQUEST message can include a preferred C-plane compatibility mode of operation for the UE 702. Additionally, in some embodiments, the REGISTRATION REQUEST message can include a requested NSSAI. The AMF 704, or another suitable network entity of the communication system, can determine, in some embodiments, UE behavior for the preferred C-plane compatibility mode of operation included in the REGISTRATION REQUEST message. In some embodiments, the AMF 704, or another suitable network entity of the communication system, can be configured to employ a U-plane compatibility mode. Additionally, in some embodiments, the AMF 704, or another suitable network entity of the communication system, can determine, based on a comparison between the UE behavior and network behavior associated with the U-plane compatibility mode, a selected mode of operation for the UE 702. In an example embodiment, the selected mode of operation is the U-plane compatibility mode of operation for the UE 702 with configured NSSAI (e.g., allowed NSSAI) for the UE 602. In some embodiments, the AMF 704, or another suitable network entity of the communication system, can cause provision of configuration information to the UE 702. In some embodiments, the configuration information can include instructions for the UE 702 to be configured with the selected mode of operation, the configured NSSAI for the UE 702, and/or compatibility class information. For instance, in some embodiments, the AMF 704, or another suitable network entity of the communication system, can send a REGISTRATION ACCEPT message to the UE 702, at 2. In some embodiments, the REGISTRATION ACCEPT message can include an indication of the selected mode of operation, the configured NSSAI for the UE 702, and/or compatibility class information. In some embodiments, the REGISTRATION ACCEPT message can additionally include an indication of one or more compatible network slices (e.g., only one or more compatible network slices for the UE 702).

In some embodiments, the UE 702 can send a REGISTRATION COMPLETE message to the AMF 704, at 3. In some embodiments, the REGISTRATION COMPLETE message can include an acknowledgment (e.g., ACK) that the UE 702 is configured with the selected mode of operation, the configured NSSAI, and/or the compatibility class information. For instance, in an example embodiment, the UE 702 can be configured with the selected mode of operation, the configured NSSAI, the compatibility class information, and/or the one or more compatible network slices in response to receiving the REGISTRATION ACCEPT message. Furthermore, in response to being configured with the selected mode of operation, the configured NSSAI, the compatibility class information, and/or the one or more compatible network slices, the UE 702 can send the REGISTRATION COMPLETE message to the AMF 704. In some embodiments, even if the UE 702 is not yet configured with the selected mode of operation, the configured NSSAI and/or the one or more compatible network slices, the UE 702 can return a REGISTRATION COMPLETE message to the AMF 704. As such, as part of the consideration, by the AMF 704 or other network entity, about whether the UE 702 should be registered with the communication system using a certain mode of operation (e.g., via a configured NSSAI, via one or more network slices, via one or more PDU sessions, via one or more core network, via the AMF 704, etc.), the AMF 704 or other network entity can determine a mode of operation for the UE 702. Furthermore, the UE 702 and the AMF 704 (or another suitable network entity of the communication system) can behave in the U-plane compatibility mode, and the UE 702 may release one or more PDU sessions that are incompatible based on local logic and/or establishing only compatible PDU session sets.

In yet another example embodiment, a UE supports a first mode of operation (e.g., a C-plane mode) and a second mode of operation (e.g., a U-plane mode) but indicates a preference for the second mode of operation (e.g., the U-plane mode), and a communications network is configured to use the first mode of operation (e.g., the C-plane mode). As such, in some embodiments, an AMF provides compatibility class info and the UE is configured to apply one or more compatibility rules for registration. Furthermore, in some embodiments, the communications network (e.g., the AMF) may reject one or more S-NSSAIs and/or may allow one or more compatible S-NSSAIs based on local policy. Moreover, in some embodiments, the UE may adjust one or more PDU sessions based on location state (e.g., request one or more rejected S-NSSAIs and/or one or more network slices compatible with the rejected S-NSSAIs).

FIG. 8 illustrates example transmissions between a UE 802 and an AMF 804 of a communication system for registering the UE 802 with one or more network slices, according to one or more embodiments. In some embodiments, the UE 802 can send a REGISTRATION REQUEST message to the AMF 804, at 1. In some embodiments, the REGISTRATION REQUEST message can include a preferred U-plane compatibility mode of operation for the UE 802. Additionally, in some embodiments, the REGISTRATION REQUEST message can include a requested NSSAI. The AMF 804, or another suitable network entity of the communication system, can determine, in some embodiments, UE behavior for the preferred U-plane compatibility mode of operation included in the REGISTRATION REQUEST message. In some embodiments, the AMF 804, or another suitable network entity of the communication system, can be configured to employ a C-plane compatibility mode. Furthermore, in some embodiments, the AMF 804, or another suitable network entity of the communication system, can reject one or more S-NSSAIs and/or may allow one or more compatible S-NSSAIs based on local location. Additionally, in some embodiments, the AMF 804, or another suitable network entity of the communication system, can determine, based on a comparison between the UE behavior and network behavior associated with the C-plane compatibility mode, a selected mode of operation for the UE 802. In an example embodiment, the selected mode of operation is the C-plane compatibility mode of operation for the UE 802 with configured NSSAI (e.g., allowed NSSAI) for the UE 802. In some embodiments, the AMF 804, or another suitable network entity of the communication system, can cause provision of configuration information to the UE 802. In some embodiments, the configuration information can include instructions for the UE 802 to be configured with the selected mode of operation, the configured NSSAI for the UE 802, one or more allowed NSSAIs, one or more rejected NSSAIs, and/or compatibility class information. For instance, in some embodiments, the AMF 804, or another suitable network entity of the communication system, can send a REGISTRATION ACCEPT message to the UE 802, at 2. In some embodiments, the REGISTRATION ACCEPT message can include an indication of the selected mode of operation, the configured NSSAI for the UE 802, one or more allowed NSSAIs, one or more rejected NSSAIs, and/or compatibility class information. In some embodiments, the REGISTRATION ACCEPT message can additionally include an indication of one or more compatible network slices (e.g., only one or more compatible network slices for the UE 802).

In some embodiments, the UE 802 can send a REGISTRATION COMPLETE message to the AMF 804, at 3. In some embodiments, the REGISTRATION COMPLETE message can include an acknowledgment (e.g., ACK) that the UE 802 is configured with the selected mode of operation, the configured NSSAI, one or more allowed NSSAIs, and/or the compatibility class information. For instance, in an example embodiment, the UE 802 can be configured with the selected mode of operation, the configured NSSAI, one or more allowed NSSAIs, the compatibility class information, and/or the one or more compatible network slices in response to receiving the REGISTRATION ACCEPT message. Furthermore, in response to being configured with the selected mode of operation, the configured NSSAI, one or more allowed NSSAIs, the compatibility class information, and/or the one or more compatible network slices, the UE 802 can send the REGISTRATION COMPLETE message to the AMF 804. In some embodiments, even if the UE 802 is not yet configured with the selected mode of operation, the configured NSSAI, one or more allowed NSSAIs, and/or the one or more compatible network slices, the UE 802 can return a REGISTRATION COMPLETE message to the AMF 804. As such, as part of the consideration, by the AMF 804 or other network entity, about whether the UE 802 should be registered with the communication system using a certain mode of operation (e.g., via a configured NSSAI, via one or more allowed NSSAIs, via one or more network slices, via one or more PDU sessions, via one or more core network, via the AMF 804, etc.), the AMF 804 or other network entity can determine a mode of operation for the UE 802. Furthermore, the UE 802 and the AMF 804 (or another suitable network entity of the communication system) can behave in the C-plane compatibility mode, and the UE 802 may request one or more different NSSAIs based on the compatibility class information.

FIG. 9 illustrates a flowchart depicting a method 900 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 204 of the apparatus 200 employing an embodiment of the present disclosure and executed by the processing circuitry 202. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 9, the operations performed, such as by the apparatus 200 of FIG. 2, in order to provide for managing mode of access to a compatible set of network slices via a network entity are depicted, in accordance with one or more embodiments of the present disclosure. As shown in block 902 of FIG. 9, the apparatus 200 includes means, such as the processing circuitry 202, the memory 204, or the like, configured to receive a registration request message from user equipment, where the registration request message comprises an indication of at least one simultaneous network slice use mode of operation for the user equipment.

As shown in block 904 of FIG. 9, the apparatus 200 includes means, such as the processing circuitry 202, the memory 204, or the like, configured to determine a selected simultaneous network slice use mode of operation for the user equipment, where the selected simultaneous network slice use mode of operation is a simultaneous network slice use mode of operation indicated by the user equipment or an alternate mode of operation associated with a configured network slice selection assistance information (NSSAI) for the user equipment. In some embodiments, the apparatus 200, such as the processing circuitry 202, can be configured to determine the selected simultaneous network slice use mode of operation based on a comparison between user equipment behavior associated with the mode of operation and network behavior associated with a set of network slices of a communications system.

In some embodiments, the apparatus 200, such as the processing circuitry 202, can be configured to select a user plane-centric simultaneous network slice use mode for the user equipment. In some embodiments, the user plane-centric simultaneous network slice use mode facilitates identification of a PDU session for simultaneous execution with respect to a network slice (e.g., from the set of network slices). In some embodiments, the apparatus 200, such as the processing circuitry 202, can be configured to perform a compatibility check of simultaneous use of network slices during the PDU session establishment associated with the user plane-centric simultaneous network slice use mode. In some embodiments, the apparatus 200, such as the processing circuitry 202, can be configured to identify the PDU session for the user plane-centric simultaneous network slice use mode based on compatibility information indicative of compatibility between network slices (e.g., between network slices of the set of network slices).

In some embodiments, the apparatus 200, such as the processing circuitry 202, can be configured to select a control plane-centric simultaneous network slice use mode for the user equipment. In some embodiments, the control plane-centric simultaneous network slice use mode facilitates identification of network slices (e.g., network slices from the set of network slices) that are mutually compatible. In some embodiments, the apparatus 200, such as the processing circuitry 202, can be configured to perform a compatibility check of simultaneous use of network slices during registration (e.g., registration of the user equipment) associated with the control plane-centric simultaneous network slice use mode.

As shown in block 906 of FIG. 9, the apparatus 200 includes means, such as the processing circuitry 202, the memory 204, or the like, configured to cause provision of configuration information to the user equipment, wherein the configuration information comprises instructions for the user equipment to be configured with the selected simultaneous network slice use mode of operation, the configured NSSAI, and an allowed NSSAI for the user equipment.

In some embodiments, the apparatus 200, such as the processing circuitry 202, can be configured to indicate only a compatible set of network slices in the configured NSSAI for the user equipment for the selected simultaneous network slice use mode of operation. In some embodiments, the apparatus 200, such as the processing circuitry 202, can be configured to cause instruction of the user equipment to update configuration of the user equipment to facilitate employing one or more network slices (e.g., one or more network slices from the set of network slices) that satisfy a defined criterion associated with user equipment behavior. In some embodiments, the apparatus 200, such as the processing circuitry 202, can be configured to cause instruction of the user equipment to adjust one or more registered network slices based on the selected simultaneous network slice use mode of operation. In some embodiments, the apparatus 200, such as the processing circuitry 202, can be configured to cause instruction of the user equipment to adjust one or more PDU sessions based on the selected simultaneous network slice use mode of operation. In some embodiments, the apparatus 200, such as the processing circuitry 202, can be configured to cause instruction of the user equipment to apply one or more compatibility rules for one or more PDU sessions based on the selected simultaneous network slice use mode of operation.

FIG. 10 illustrates a flowchart depicting a method 1000 according to an example embodiment of the present disclosure. It will be understood that each block of the flowchart and combination of blocks in the flowchart can be implemented by various means, such as hardware, firmware, processor, circuitry, and/or other communication devices associated with execution of software including one or more computer program instructions. For example, one or more of the procedures described above can be embodied by computer program instructions. In this regard, the computer program instructions which embody the procedures described above can be stored, for example, by the memory 204 of the apparatus 200 employing an embodiment of the present disclosure and executed by the processing circuitry 202. As will be appreciated, any such computer program instructions can be loaded onto a computer or other programmable apparatus (for example, hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring now to FIG. 10, the operations performed, such as by the apparatus 200 of FIG. 2, in order to provide for managing mode of access to a compatible set of network slices via user equipment are depicted, in accordance with one or more embodiments of the present disclosure. As shown in block 1002 of FIG. 10, the apparatus 200 includes means, such as the processing circuitry 202, the memory 204, or the like, configured to cause transmission of a registration request message associated with user equipment to a network device, where the registration request message comprises an indication of at least one simultaneous network slice use mode of operation for the user equipment.

As shown in block 1004 of FIG. 10, the apparatus 200 includes means, such as the processing circuitry 202, the memory 204, or the like, configured to receive, from the network device, configuration information comprising instructions for the user equipment to be configured with a selected simultaneous network slice use mode of operation for the user equipment, where the selected simultaneous network slice use mode of operation is a simultaneous network slice use mode of operation indicated by the user equipment or an alternate mode of operation associated with a configured network slice selection assistance information (NSSAI) for the user equipment. In some embodiments, the selected mode of operation for the user equipment is determined based on a comparison between user equipment behavior associated with the mode of operation and network behavior associated with a set of network slices of a communications system.

In some embodiments, the apparatus 200, such as the processing circuitry 202, can be configured to receive instructions to configure the user equipment with a user plane-centric simultaneous network slice use mode for the user equipment. In some embodiments, the user plane-centric simultaneous network slice use mode facilitates identification of a PDU session for simultaneous execution with respect to a network slice (e.g., a network slice from the set of network slices).

In some embodiments, the apparatus 200, such as the processing circuitry 202, can be configured to receive instructions to configure the user equipment with a control plane-centric simultaneous network slice use mode for the user equipment. In some embodiments, the control plane-centric simultaneous network slice use mode facilitates identification of network slices (e.g., network slices from the set of network slices) that are mutually compatible.

In some embodiments, the apparatus 200, such as the processing circuitry 202, can be configured to receive an indication of only a compatible set of network slices in the configured NSSAI for the user equipment for the selected simultaneous network slice use mode of operation. In some embodiments, the apparatus 200, such as the processing circuitry 202, can be configured to receive an indication to employ one or more network slices (e.g., one or more network slices from the set of network slices) that satisfy a defined criterion associated with user equipment behavior. In some embodiments, the apparatus 200, such as the processing circuitry 202, can be configured to receive an indication to adjust one or more registered network slices based on the selected simultaneous network slice use mode of operation. In some embodiments, the apparatus 200, such as the processing circuitry 202, can be configured to receive an indication to adjust one or more PDU sessions based on the selected simultaneous network slice use mode of operation. In some embodiments, the apparatus 200, such as the processing circuitry 202, can be configured to receive an indication to apply one or more compatibility rules for one or more PDU sessions based on the selected simultaneous network slice use mode of operation.

As shown in block 1006 of FIG. 10, the apparatus 200 includes means, such as the processing circuitry 202, the memory 204, or the like, configured to configure the user equipment with the selected simultaneous network slice use mode of operation, the configured NSSAI, and an allowed NSSAI for the user equipment.

As described above, FIGS. 9-10 are flowcharts of various methods that can be carried out by, e.g., the apparatus 200, and/or according to a computer program product, according to example embodiments of the disclosure. A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as, e.g., in conjunction with the communications flowcharts of FIGS. 3-8 or as part of the system of FIG. 1. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising processing circuitry and at least one memory including computer program code instructions, the computer program code instructions configured to, when executed by the processing circuitry, cause the apparatus to:
receive a registration request message from user equipment, wherein the registration request message comprises an indication of at least one simultaneous network slice use mode of operation for the user equipment;
determine a selected simultaneous network slice use mode of operation for the user equipment, wherein the selected simultaneous network slice use mode of operation is a simultaneous network slice use mode of operation indicated by the user equipment or an alternate mode of operation associated with a configured network slice selection assistance information (NSSAI) for the user equipment, wherein determining the selected simultaneous network slice use mode of operation comprises comparing behavior of the user equipment associated with a mode of operation and network behavior associated with a set of network slices of a communication, and, based on the comparison, determining the selected simultaneous network slice use mode of operation;
cause provision of configuration information to the user equipment, wherein the configuration information comprises instructions for the user equipment to be configured with the selected simultaneous network slice use mode of operation, the configured NSSAI, and an allowed NSSAI for the user equipment;
select a user plane-centric simultaneous network slice use mode for the user equipment;
identify a protocol data unit (PDU) session for simultaneous execution with respect to a network slice based on the user plane-centric simultaneous network slice use mode;
select a control plane-centric simultaneous network slice use mode for the user equipment;
identify network slices that are mutually compatible based on the control plane-centric simultaneous network slice use mode; and
cause updating of the configuration information for the user equipment to employ the identified network slices, and tuning behavior of the user equipment in a manner tailored to a particular network deployment.

2. The apparatus of claim 1, wherein the computer program code instructions are further configured to, when executed by the processing circuitry, cause the apparatus to perform a compatibility check of simultaneous use of network slices during a PDU session establishment or during registration.

3. The apparatus of claim 1, wherein the computer program code instructions are further configured to, when executed by the processing circuitry, cause the apparatus to indicate only a compatible set of network slices in the configured NSSAI for the user equipment for the selected simultaneous network slice use mode of operation.

4. The apparatus of claim 1, wherein the computer program code instructions are further configured to, when executed by the processing circuitry, cause the apparatus to cause instruction of the user equipment to adjust one or more registered network slices and/or one or more PDU sessions based on the selected simultaneous network slice use mode of operation.

5. A method, comprising:
causing transmission of a registration request message associated with user equipment to a network device, wherein the registration request message comprises an indication of at least one simultaneous network slice use mode of operation for the user equipment;
receiving, from the network device, configuration information comprising instructions for the user equipment to be configured with a selected simultaneous network slice use mode of operation for the user equipment, wherein the selected simultaneous network slice use mode of operation is a simultaneous network slice use mode of operation indicated by the user equipment or an alternate mode of operation associated with a configured network slice selection assistance information (NSSAI) for the user equipment;
configuring the user equipment with the selected simultaneous network slice use mode of operation, the configured NSSAI, and an allowed NSSAI for the user equipment;
configuring the user equipment with a user plane-centric simultaneous network slice use mode based on the received configuration information,
identifying a protocol data unit (PDU) session for simultaneous execution with respect to a network slice based on the user plane-centric simultaneous network slice use mode,
configuring the user equipment with a control plane-centric simultaneous network slice use mode based on the received configuration information,
identifying network slices that are mutually compatible based on the control plane-centric simultaneous network slice use mode; and
updating the configuration information for the user equipment to employ the identified network slices, and tuning behavior of the user equipment in a manner tailored to a particular network deployment.

6. The method of claim 5, wherein the receiving the configuration information comprises receiving an indication of only a compatible set of network slices in the configured NSSAI for the user equipment for the selected simultaneous network slice use mode of operation.

7. The method of claim 6, wherein the receiving the configuration information comprises receiving an indication to employ one or more network slices that satisfy a defined criterion associated with user equipment behavior.

8. The method of claim 5, wherein the receiving the configuration information comprises receiving an indication to adjust one or more registered network slices based on the selected simultaneous network slice use mode of operation.

9. An apparatus comprising processing circuitry and at least one memory including computer program code instructions, the computer program code instructions configured to, when executed by the processing circuitry, cause the apparatus to:
cause transmission of a registration request message associated with user equipment to a network device, wherein the registration request message comprises an indication of at least one simultaneous network slice use mode of operation for the user equipment;
receive, from the network device, configuration information comprising instructions for the user equipment to be configured with a selected simultaneous network slice use mode of operation for the user equipment, wherein the selected simultaneous network slice use mode of operation is a simultaneous network slice use mode of operation indicated by the user equipment or an alternated mode of operation associated with a configured network slice selection assistance information (NSSAI) for the user equipment;
configure the user equipment with the selected simultaneous network slice use mode of operation, the configured NSSAI, and an allowed NSSAI for the user equipment;
configure the user equipment with a user plane-centric simultaneous network slice use mode based on received configuration information,
identify a protocol data unit (PDU) session for simultaneous execution with respect to a network slice based on the user plane-centric simultaneous network slice use mode,
configure the user equipment with a control plane-centric simultaneous network slice use mode based on the received configuration information,
identify network slices that are mutually compatible based on the control plane-centric simultaneous network slice use mode;
update the configuration information for the user equipment to employ the identified network slices, and tune behavior of the user equipment in a manner tailored to a particular network deployment.

10. The apparatus of claim 9, wherein the computer program code instructions are further configured to, when executed by the processing circuitry, cause the apparatus to receive an indication of only a compatible set of network slices in the configured NSSAI for the user equipment for the selected simultaneous network slice use mode of operation.

11. The apparatus of claim 9, wherein the computer program code instructions are further configured to, when executed by the processing circuitry, cause the apparatus to receive an indication to employ one or more network slices that satisfy a defined criterion associated with behavior of the user equipment.

12. The apparatus of claim 9, wherein the computer program code instructions are further configured to, when executed by the processing circuitry, cause the apparatus to receive an indication to adjust one or more registered network slices based on the selected simultaneous network slice use mode of operation.

13. The apparatus of claim 9, wherein the computer program code instructions are further configured to, when executed by the processing circuitry, cause the apparatus to receive an indication to adjust one or more PDU sessions based on the selected simultaneous network slice use mode of operation.

* * * * *